United States Patent [19]

Giras et al.

[11] 4,258,424

[45] Mar. 24, 1981

[54] SYSTEM AND METHOD FOR OPERATING A STEAM TURBINE AND AN ELECTRIC POWER GENERATING PLANT

[75] Inventors: Theodore C. Giras, Forest Hills; Manfred E. Birnbaum, Philadelphia, both of Pa.

[73] Assignee: Westinghouse Electric Corp., Pittsburgh, Pa.

[21] Appl. No.: 720,725

[22] Filed: Sep. 7, 1976

Related U.S. Application Data

[63] Continuation of Ser. No. 319,115, Dec. 29, 1972, abandoned, which is a continuation of Ser. No. 124,993, Mar. 16, 1971, abandoned, which is a continuation of Ser. No. 722,779, Apr. 19, 1968, abandoned.

[51] Int. Cl.³ .......................... G06F 15/46; F01B 25/00

[52] U.S. Cl. .......................................... 364/494; 60/660

[58] Field of Search ...................... 235/151.21, 151.31, 235/151; 60/660, 105; 384/493, 494

[56] References Cited

U.S. PATENT DOCUMENTS

| | | | |
|---|---|---|---|
| 3,097,488 | 7/1963 | Eggenberger et al. | 60/73 |
| 3,958,109 | 5/1976 | Doherty et al. | 235/151 |
| 4,027,145 | 5/1977 | McDonald et al. | 235/151.21 |

*Primary Examiner*—Edward J. Wise
*Attorney, Agent, or Firm*—E. F. Possessky

[57] ABSTRACT

A programmed digital computer control system determines the turbine steam flow changes required to satisfy the speed and load demand made on the operation of a large electric power stream turbine for which substantially constant throttle pressure steam is generated. Load control is directed to plant electric power generation and it is based on feedforward valve positioning operation with feedback multiplication calibration for plant load and/or turbine speed error. Changes in the turbine operating level are limited by dynamic constraints applied by the computer.

68 Claims, 5 Drawing Figures

SYSTEM AND METHOD FOR OPERATING A STEAM TURBINE AND AN ELECTRIC POWER GENERATING PLANT

CROSS-REFERENCE TO RELATED APPLICATIONS

This is a continuation of application Ser. No. 319,115, filed Dec. 29, 1972, which is a continuation of Ser. No. 124,993, filed Mar. 16, 1971, which is a continuation of Ser. No. 722,779, filed Apr. 19, 1968, all abandoned.

1. Ser. No. 722,790 entitled "System and Method For Providing Steam Turbine Operation With Improved Dynamics" filed by W. R. Berry on Apr. 19, 1968, assigned to the present assignee and now patented as U.S. Pat. No. 3,588,265.

2. Ser. No. 866,965 entitled Overspeed Protection Controller filed by M. Birnbaum, A. Braytenbah and A. Richardson on Oct. 16, 1969, assigned to the present assignee and now patented as U.S. Pat. No. 3,643,437.

3. Ser. No. 815,882 entitled Improved Computer Positioning Control System With Manual Backup Control Especially Adapted For Operating Steam Turbine Valves and filed by T. Giras W. W. Barna, Jr. on Apr. 14, 1969, assigned to the present assignee and now patented as U.S. Pat. No. 3,552,872.

BACKGROUND OF THE INVENTION

The present invention relates to elastic fluid turbines and more particularly to systems and methods for operating steam turbines and to electric power plants in which generators are operated by steam turbines.

One general type of steam is the extraction type which typically although not necessarily would be classed as a small turbine and which further would be typically designed to supply the extracted steam required for a plant process and the turbine motive flow required for driving an industrial plant or electric power plant generator of predetermined electric power rating. Thus, an extraction turbine of suitable design rating might act as a prime mover in operating a paper mill plant generator while simultaneously supplying steam flow extracted from the main turbine steam flow for the paper making process and other purposes. Operation as a prime mover may be either a primary or a secondary role of the extraction turbine. Other turbines similar in end function to the extraction type include (1) back pressure turbines which exhaust motive steam flow under pressure control for process, heating or other purposes and (2) seawater conversion turbines which operate electric power generators and supply the steam flow needed for heating the converted seawater in a desalination plant. Turbines employed in the latter application may be of the extraction or back pressure type.

Another general type of steam turbine is that in which the steam is used primarily only to operate the turbine as a prime mover in power plant and other applications. In large electric power generation plants, such turbines drive large electric generators and are therefore of relatively large size and capacity. Turbine configurations vary from power plant application to application, and, in a fossil fuel fired plant, a turbine typically might include high pressure, intermediate pressure and low pressure sections tandemly interconnected on a single or multiple shaft with one or more successive reheat stages between the sections. A preselected power plant steam generating system provides steam to operate the turbine primarily only to generate electric power, but the turbine may also perform some relatively low power auxiliary functions such as boiler feed pump operation. Other prime mover turbines include shipboard electric generation turbines and ship propulsion turbines which are operated to control propeller torque and ship speed.

The extraction and prime mover turbines are the principal turbine types which are defined by the partitioning of different kinds of steam turbines on the basis of the character of the use made of the turbine inlet steam. Partitioning can also be made on the basis of the character of the steam generating system, and fossil fuel turbines and nuclear turbines are the principal steam turbine types defined under this characterization.

At the present time, commercial nuclear turbines are principally used in electric power generation applications although they have been proposed for other nuclear applications such as sea water conversion plants. Nuclear turbines and their control systems generally differ according to the character of the nuclear steam generating system, i.e. the boiling water reactor system, the pressurized water reactor system, etc. Fossil fuel turbines and particularly their control systems normally also differ according to the type of steam generating system employed, i.e. the drum type boiler system, the once through boiler system, etc.

Each general type of turbine may also be subpartitioned into different subtypes on the basis of preselected turbine characteristics such as power rating, structural design, steam pressure and/or temperature design operating characteristics, number of turbine sections and stages, turbine steam flow arrangement, number of rotor shafts (i.e. presence or absence of compounding), number of reheat stages, etc. Typically, because of the region of steam table operation and other operating characteristics of reactor steam generating systems, nuclear turbines are designed to operate with dry saturated steam at a relatively low throttle pressure such as 800 psi whereas the high pressure section of a large fossil fuel electric power plant turbine would typically be designed to operate with highly superheated steam at a much higher throttle pressure such as 3500 psi.

With respect to steam turbine control, prime mover turbine controls usually operate to determine turbine rotor shaft speed, turbine load and/or turbine throttle pressure as end controlled system variables. In the case of large electric power plants where steam throttle pressure controlled by the steam generating system, turbine control is typically directed to the megawatt amount of electrical load and the frequency participation of the turbine after turbine rotor speed has been controllably brought to the synchronous value and the generator has been connected to the electric power system.

Among other types of control, propulsion turbine control typically determines the turbine shaft speed and torque as in the case of ship propulsion turbines. Extraction turbine controls are normally operated to determine turbine speed and/or load as well as extracted process steam pressure as end controlled system variables. Extraction turbine operation thus requires multivariable control system operation, i.e. the prime mover and the process steam requirements are integrated in the determination of control actions and operating strategies to be taken. Back pressure turbines and sea water conversion turbines also typically entail the use of specially functioning controls in their operation.

The end controlled plant or turbine system variable(s) and turbine operation are normally determined by controlled variation of the steam flow to one or more of the various stages of the particular type and the particular design of turbine in use. In prime mover turbine applications such as drum type boiler electric power plants where turbine throttle pressure is externally controlled by the boiler operation, the turbine inlet steam flow is an end controlled steam characteristic or an intermediately controlled system variable which controllably determines in turn the end controlled system variable(s), i.e. the turbine speed, the electrical load, or the turbine speed and the electrical load. It is noteworthy, however, that some supplemental or protective control may be placed on the end controlled variable by additional downstream steam flow control such as by control of reheat valving and to that extent inlet turbine steam flow control is not strictly wholly controllably determinative of the end controlled system variables under all operating conditions.

Among other turbine types which can operate with externally controlled throttle pressure, extraction turbines use inlet steam flow control to provide partial determination of the end controlled system variables, i.e. turbine speed and extraction pressure. Downstream steam flow control interacting with the inlet steam flow control provides the balance of the determinative control placed on the end controlled extraction turbine system variables.

Where independent external control does not wholly control turbine throttle pressure such as in boiling water reactor turbine plants or in once through boiler turbine plants, inlet turbine steam flow control may be used to regulate throttle pressure as an end controlled or constrained system variable. In that event, turbine steam flow control determines the end plant system variable(s) such as plant electrical load subject to the control or constraint of throttle pressure.

In determining turbine operation and the end controlled system variables, turbine steam flow control has generally been achieved by controlled operation of valves disposed in the steam flow path(s). To illustrate the nature of turbine valve control in general and to establish simultaneously some background for subsequent description, consideration will now be directed to the system structure and operation of a typical large electric power tandem steam turbine designed for use with a fossil fuel drum type boiler steam generating system.

Steam generated at controlled pressure may be admitted to the turbine steam chest through one or more throttle stop valves operated by the turbine control system. Governor or control valves are arranged to supply steam to steam inlets disposed about the periphery of the high pressure turbine section casing. The governor valves are also operated by the turbine control system to determine the flow of steam from the steam chest through the stationary nozzles or vanes and the rotor blading of the high pressure turbine section.

Usually, full arc admission governor valve operation with throttle valve control is employed during turbine startup primarily because excessive thermal rotor stress is caused by partial arc admission operation. At some point in the speed or load buildup dictated by efficiency and/or other considerations, the throttle valving is opened fully and steam flow control is transferred to partial arc governor valve operation.

Torque resulting from the work performed by steam expansion causes rotor shaft rotation and the reduced pressure steam is usually then directed to a reheat stage where its enthalpy is raised to a more efficient operating level. In the reheat stage, the high pressure section outlet steam is ordinarily directed to one or more reheaters associated with the primary steam generating system where heat energy is applied to the steam. In large electric power nuclear turbine plants, turbine reheat stages are usually not used and instead combined moisture separator-reheaters are employed between the tandem nuclear turbine sections.

Reheated steam crosses over to the next or intermediate pressure section of the large fossil fuel turbine where additional rotor torque is developed as the intermediate pressure steam expands and drives the intermediate pressure turbine blading. One or more interceptor and/or reheat stop valves are usually installed in the reheat steam flow path or paths in order to cut off or reduce the flow of turbine contained steam as required to protect against turbine overspeed. Reheat and/or interceptor valve operation at best produces late corrective turbine response and accordingly is normally not used as a primary determinant of turbine operation.

Additional reheat may be applied to the steam after it exits from the intermediate pressure section. In any event, steam would typically be at a pressure of about 1200 psi as it enters the next or low pressure turbine section usually provided in the large fossil fuel turbines. Additional rotor torque is accordingly developed and the vitiated steam then exhausts to a condenser.

In both the intermediate pressure and the low pressure sections, no direct steam flow control is normally applied as already suggested. Instead, steam conditions at these furbine locations are normally determined by the mechanical system design subject to time delayed effects following control placed on the high pressure section steam admission conditions.

In the typical large fossil fuel turbine just described, thirty percent of the total steady state torque might be generated by the high pressure section and seventy percent might be generated by the intermediate pressure and low pressure sections. In practice, the mechanical design of the turbine system defines the number of turbine sections and their respective torque ratings as well as other structural characteristics such as the disposition of the sections on one or more shafts, the number of reheat stages, the blading and vane design, the number and form of turbine stages and the steam flow paths in the sections, etc.

A variety of valve arrangements may be used for steam control in the various turbine types and designs, and hydraulically operated valve devices have generally been used for steam control in the various valving arrangements. The use of hydraulically operated valves has been predicated largely on their relatively low cost coupled with their ability to meet stroke operating power and positioning speed and accuracy requirements.

Previous automatic turbine control schemes involving hydraulic turbine valves were based on principally hydraulic feedback control having some mechanical couplings as shown for example in prior art extraction turbine control U.S. Pat. Nos. Bryant 2,552,401 and Marsland 1,777,470 or principally mechanical feedback control as exemplified in prior art U.S. Pat. No. Eggenberger 3,027,137. Thereafter, advances in electronic solid state circuitry with its inherent reliability made it desirable to employ electrical feedback principles for automatic hydraulic valve control in commercial applications. Electrohydraulic analog type turbine control systems are described in prior art U.S. Pat. Nos. including for example Bryant 2,262,560, Herwald 2,512,154, Eggenberger 3,097,488; 3,097,489; 3,098,176 and Callan 3,097,490.

An early solid state electrohydraulic analog-digital turbine control system known as DACA has been applied in a number of customer installations by Westinghouse Electric Corporation. The DACA system relates primarily to turbine speed control in various applications such as paper mills and ships. Extraction type analog turbine control systems also have employed electrohydraulic control as set forth for example in prior art U.S. Pat. Nos. including Wagner 2,977,768, 3,064,435, 3,091,933, 3,233,412 and 3,233,413.

Generally, prior art analog or analog-digital electrohydraulic turbine control systems employed closed loop feedback operation. Basically, the end system variable controlled by valve operation or a representation of that variable may be sensed and compared to a setpoint value to generate an error signal. Circuitry including an analog controller acts on the error signal with preset loop gain and often with a preset transfer characterization to develop a control signal which effects hydraulic operation of the turbine steam valving through a valve positioning control including a servo valve, an actuator, and a position error feedback driven controller which operates the servo valve. When the error is reduced to zero, corrective valve control action is terminated.

In prime mover turbines, a speed error signal may determine the control action alone or in conjunction with a load control signal. As another prior art turbine control loop example, multivariable extraction turbine control action requires separate speed and extraction pressure control loops with the speed and pressure error signals directly determining the speed and pressure loop control actions respectively and with crossover coupling between the loops modifying the pressure and speed loop control actions respectively.

When the end variable controlled by valve operation is turbine load as in large constant throttle pressure electric power plant turbines, the load control loop may be open or closed and it usually operates jointly with the closed speed feedback loop. After the turbine is brought to synchronous speed by speed loop operation, the speed error normally holds at zero and the load control loop operates the steam valving to determine the turbine steam flow and the amount of the total system load shared by the turbine. To hold synchronous speed, frequency participative speed control action is applied during transient speed disturbances caused by large load changes.

In some prior art cases, the load control loop may be open or substantially open in operation in that valve positions are instituted manually or automatically to provide desired or reference load, and subsequently valve setting changes are manually initiated if the generated megawatt reading or other load detecting variable is in error. Faster but still delayed load control is achieved in other art cases with the use of an interstage reheat pressure signal as a closed load loop feedback signal. The fastest load control has been obtainable with the use of impulse chamber or first expansion stage closed loop pressure feedback.

In this as well as the general prior art case, suitable characterizing circuitry may be included in the load control loop in operating upon the load demand, i.e. the load reference or the load error signal. Typically, the characterization may statically compensate for the usual nonlinear valve position-flow characteristics thereby producing a linear relationship between controlled steam flow changes and changes in the load demand level or it may introduce nonlinearity intended to produce valve back seating.

A commercially supplied prior art electrohydraulic turbine control scheme is shown and described more specifically in a printed paper entitled "Electrohydraulic Control For Improved Availability and Operation of Large Steam Turbines" and presented by M. Birnbaum and E. G. Noyes to the ASME-IEEE National Power Conference at Albany, N.Y. during Sept. 19–23, 1965. In that scheme, feedback control is employed to regulate turbine speed and load in large electric utility steam turbines. Some digital circuitry is included especially a solid state digital reference system which eliminated earlier speed/load changer motor systems for establishing the turbine speed and load setpoint changes on a permissive ramp scheduled basis. An article entitled "Automatic Electronic Control Of Steam Turbines According To A Fixed Programme" in the March 1964 issue of the Brown Boveri Review relates to similar subject matter.

Although the known various types of prior art electrohydraulic turbine control and electric power plant systems have in general provided satisfactory turbine and power plant operation and control results, they have had particular shortcomings many of which are inherent consequences of the basic character of these systems. For instance, as already indicated, it has been the practice to utilize feedback operated loops or uncorrected open loops in which transfer function circuitry provides compensation for nonlinearity in the position-steam flow characteristic curves of the turbine valves and there are inherent in this feature certain disadvantages.

The purpose of using the static compensation characterizing circuitry is to attempt to make the steam flow rather than the steam valve position proportional to the feedback error demand or the reference demand and thereby make the amount of control action proportional to the amount of demand placed on the control. It is inconvenient and often difficult to realize accurately linearizing transfer function circuitry for the variously characterized valves with which a control would be associated in any particular turbine unit or from turbine unit tc turbine unit of production. One reason for this is that each valve or valve arrangement might require a special accurately linearizing transfer function and accordingly necessitate special and relatively costly electronic hardware to obtain that function.

Another and perhaps more significant reason is that a truly linearizing transfer function circuit may not be economically and feasibly obtainable such as where the valve position-flow characteristic in general has a positive slope but along one or more curved segments it has negative sloping with zero slope turning points at each of the segment ends. Further, even where appropriate linearizing transfer function circuitry is developed for a particular valve arrangement, system usage can change the valve position-flow characteristic as a result of valve wear, etc. and the original inflexible static transfer function circuit no longer accurately achieves its purpose thereby inconveniently making maintenance modification desirable or necessary.

In the general case, it is noteworthy by extension that the same or similar comments apply regarding applications difficulties where static control system transfer functions selected before or during turbine operation are used to produce some relationship either linear or other than linear between the controlled steam condition such as flow and the demand made on the control system. Because of the related shortcomings in control loop static characterization, prior art turbine operation and control have been deficient across the turbine art from the standpoint of efficiency and accuracy. In the area of electric power plant turbines supplied by fossil fuel fired drum type boilers or other steam generating systems, inefficiencies and inaccuracies stemming from these shortcomings have caused reduced power generating control flexibility and higher generating costs.

Apart from static characterizing, another difficulty with prior electrohydraulic turbine valve control systems and associated turbine operation has been the limited utility experienced with respect to turbine dynamics, i.e. controlling the speed of steam valve response and the speed of turbine energization response. Typically, turbine control systems have control looping which is dynamically characterized with proportional action and with appropriate gain for stable valve positioning and stable turbine drive responses. A loop so characterized may or may not result in desired dynamic steam valve response and desired dynamic turbine steam energization response and, in electric power plants, desired power generation response as the system operating conditions undergo variation.

One aspect of the dynamic characterization difficulty stems from the fact that different magnitudes of change in the valve position setpoint may require different positioning loop gains in order to achieve the desired dynamic valve positioning response on a consistent basis. For example, it may be desired to produce fast stable valve positioning operation with huntless 10% overshoot. A small position setpoint change may require a first gain $G_1$ to achieve this response while a larger position setpoint change may require a second and higher gain $G_2$. Since the positioning gain is typically fixed, the desired valve positioning response can only be achieved within a limited range of valve position setpoint changes.

Further difficulty has been experienced with conventional turbine control dynamic characterization from the standpoint of control loop bandwidth limitations on the amount of loop gain usable for achieving stable response. This limiting and inefficient quality of the prior art requires relatively reduced loop gain to limit noise interferences with control action. Thus, a limit is placed on the speed with which valve position and turbine steam energization responses can be achieved where a faster response might otherwise be desirable and obtainable within the limits of turbine thermal and mechanical dynamics. Bandwidth limitations on turbine process control capability especially arise in turbine control systems having cascaded loops with summing junctions, such as in large electric power plant turbine control systems where the gain of an inner valve positioning loop acts on the output of an outer load control loop and thereby requires a cutback in outer loop gain to achieve adequately low response level to outer load control loop noise signals.

Another aspect of the dynamic characterization difficulty stems from the fact that a typical proportional action loop, even though it may act in some circumstances with the desired fast and accurate valve positioning within the limits of turbine thermal and mechanical capabilities, will in most cases cause overdamped turbine steam energization response because a changed steam flow requires time to cause the steady state steam drive energization of the turbine to reach the new level corresponding to the new steam flow. The significance of this shortcoming varies in accordance with the amount and the significance of the excessive time delay involved in the turbine energization response. In the case of large electric power turbines, the difference in time between critical and typically overdamped responses is relatively short in comparison with other plant operating limitations and therefore has not been too objectionable. In other words, electric power plant turbine energization response normally is nonoptimal in the strictest sense, yet little or no power plant operating advantage is normally obtained by increasing the speed of turbine energization response because of other plant constraints. However, in at least some possible electric power plant applications and in other turbine applications across the turbine art where optimal or more nearly optimal turbine dynamics have been desirable or would be desirable if practically achievable, previous turbine controls have been somewhat deficient.

To produce some increase in turbine response speed, prior controls might use some dynamic characterization including analog rate action for example. In that event, steam valve positioning may be produced within the limits of turbine thermal and mechanical dynamics with valve position overdrive which persists beyond the previously noted quickly executed 10% overshoot used for achieving fast nonhunting valve positioning. As a result, steam flow temporarily overshoots, and faster nonovershoot turbine drive energization is produced as valve position is ultimately countercorrected to provide the required steady state steam flow. However, as in the case of static characterization, the dynamic characterization cannot be adjusted conveniently to provide stable and consistently faster turbine response under varying operating conditions.

Prior art difficulty in the area of dynamic characterization and its role in determining steam valve response and turbine energization response and, in electric power plants, power generation response thus stems from inability to achieve particular responses as well as from relatively rigid inability to achieve (1) conveniently selectable response after system installation and before system operation and (2) convenient or automatic variation in steam valve response and turbine energization response needed after system startup to meet particular performance specifications under different operating conditions or to satisfy the requirements of optimizing or near optimizing control. Operating and control efficiency and accuracy have thus been adversely affected in the area of electric power plant turbines as well as across the entire turbine art by inflexibility of control loop dynamic characterization.

As in the case of static characterization and other prior art deficiencies, slowness of turbine control and inaccuracy and inefficiency of turbine operation resulting from inadequate prior art dynamic characterization have led to objectionable deviation of the end controlled system variable(s) from the desired value(s). For example, steam turbine slowness in driving an electric power plant generator accurately to a new power contribution level can negate some of the economic gain otherwise achieved by the functioning of an economic dispatch computer.

In addition to relatively costly hardware changes required for changed static characterizing transfer functions from unit to unit of a particular type of turbine, there have been long standing, costly and inflexible differences in hardware design among the conventional control systems tailored for the various types of turbines, i.e. extraction turbines, large electric plant turbines, boiling water reactor turbines, pressurized water reactor turbines, etc. Although different specific turbine operating characteristics and control results are necessary for the various turbine types, the capital costs associated with the wide variety of prior art turbine control hardware needed for this purpose have, certainly along with other factors, generally inhibited the marketability of steam turbines and steam turbine controls.

The relatively high capital cost characteristic of conventional inflexible turbine controls has also in general limited the extent to which functional sophistication can be incorporated in turbine operation, i.e. more advanced functioning requires increasingly more costly hardware application. Inflexibility and high cost of conventional turbine controls has more specifically restrictively affected development of integrating controls for large system applications which include steam turbines as a large component piece of equipment. Thus, the special engineering needed for interfacing prior art turbine controls with plant associated controls, such as steam generating system controls in an electric utility plant, has for economic and other reasons limited the advanceability of the turbine operation and control art by limiting the extent to which the interfacing can be made more integrational or more interdependent.

In a similar manner, inflexibility of conventional large turbine control schemes has even caused the capital cost of state of the art hardware systems to become objectionable. Thus, interlock and supervisory circuitry and equipment required for system monitoring, supervision, protection and sequencing has in many cases expanded to comprise as much as eighty percent of the control system hardware cost. The inconvenience and cost of modifying the wired hardware after installation to achieve needed changes in interlock, supervisory and like functions has resulted in further difficulty and objection.

In brief summary, it is clear that prior art operation and control of the various types of steam turbines including large electric power steam turbines are characterized with (1) inaccuracy and inefficiency in steam turbine operation and electric power plant operation due to limited steam valve operating accuracy and limited and inflexible control loop static characterization, (2) inaccuracy, inefficiency and slowness in steam turbine and electric power plant operation due to limited steam valve control flexibility and limited control loop dynamic characterization, (3) inaccuracy and inefficiency in the operation of electric power and other cascade loop controlled steam turbines and in electric power plant operation due to bandwidth limited control system response speed, (4) limited steam turbine and turbine control marketability caused by relatively high cost electrical control systems in turn caused generally by special hardware requirements such as extensive interlocking and supervisory hardware differences from system to system, and (5) limited steam turbine and turbine control marketability caused by the relatively high hardware cost associated with advancement of the art.

The state of the turbine operation and control art is improved and advanced by the present invention since it is arranged and organized to provide improved turbine performance with reduced relative cost. It achieves these results in its preferred form with the employment of a programmed digital computer.

SUMMARY OF THE INVENTION

In accordance with the broad principles of the present invention, a steam turbine of preselected type is operated and controlled by a system comprising steam valving and preferably electrohydraulically operated steam valving for determining the flow of steam through at least one section of the turbine and means for actuating the steam valving in accordance with a steam valve position demand. A determination is made of the valve position demand required in accordance with a predetermined characterization to satisfy an input demand made for at least one predetermined system variable such as turbine speed or load placed under end control by steam valve operation.

With the employment of feedforward control principles in developing steam valve control action, the turbine operating system and method enables better steam valve positioning dynamics and better turbine steam energization dynamics through a capability for steam valve positioning loop gain control and through a capability for steam turbine dynamic optimization. Further improvement in turbine control and operation stems from the fact that better dynamics are realized from feedback multiplier calibrated control loops which are made possible by the system valve positioning operation.

Generally, the system preferably includes at least one loop with feedback to develop a representation of error between the actual value and a reference value for the predetermined end controlled system variable. The feedback supplied loop can apply its error representation as the input demand for the feedforward loop, but preferably the feedback supplied loop is cascaded at another junction point with the feedforward control loop to correct for any usually minor errors in feedforward determinations made from a reference input demand. The loop cascading junction provides for feedforward modification by multiplication with reduced control system bandwidth limitation and resulting higher gain operation, faster steam valve positioning and faster turbine steam energization response.

In a specific electric power plant embodiment, a large electric power turbine is supplied with steam from a fossil fuel drum type boiler and the turbine drives a generator. The valve position demand determining means operates in a speed determination control loop during turbine startup and if desired during shutdown and in a load determination control loop during synchronous turbogenerator operation. The speed determination loop preferably includes predetermined static and dynamic characterizing functions which develop turbine dynamics controlled steam valve positioning in response to detected feedback speed error. The load determination loop preferably includes predetermined static and dynamic characterizing functions which develop turbine dynamics controlled feedforward steam valve positioning in response to a load reference.

A preferably relatively low grain loop supplied with predetermined load feedback and preferably including at least impulse pressure feedback develops a load error determination. Preferably, the load error is a reset determination, i.e. an integral of the preferred impulse pressure error, and it is applied to the load feedforward determination loop as a multiplication calibration. The feedforward loop gain varies according to the magnitude of the load calibration error and thus in general can be set to provide faster steam valve positioning control with reduced bandwidth or noise limitation. The speed feedback error is preferably employed for frequency calibration of the feedforward load determination during the load control mode of operation.

It is further preferred that the invention be embodied in its different apparatus forms with the employment of a programmed digital computer system as a direct digital controller for most or all control actions. Interfacing of the computer system with the controlled steam turbine is made through the preferred electrohydraulic valving and other controlled devices as well as speed, pressure and other sensors and status contacts. With employment of a digital computer system, extended turbine operating and economy benefits can be realized.

A programming system for the computer system provides software flexibility and functional capacity which are especially beneficial for economically achieving interlocking, supervisory and characterization functions from turbine type to turbine type and from turbine design to turbine design within any one turbine type. Further, digital computer system and programming system characteristics offer the operating speed and functional capacity needed to achieve control loop static characteristics resulting in more accurate steam valve positioning control and control loop dynamic characterizations resulting in faster, stable and accurate steam turbine response and better or optimized dynamics of turbine operation and control.

It is therefore an object of the invention to provide a novel system and method for operating a steam turbine and an electric power plant with improved performance.

Another object of the invention is to provide a novel system and method for operating a steam turbine and an electric power plant more economically and more efficiently.

A further object of the invention is to provide a novel system and method for operating a steam turbine with stable, faster and more accurate steam valve positioning.

An additional object of the invention is to provide a novel system and method for operating a steam turbine with stable, faster and more accurate turbine steam energization.

A further object of the invention is to provide a novel system and method for operating a steam turbine with improved control loop dynamics including reduced bandwidth limitation.

It is another object of the invention to provide a novel system and method for operating a steam turbine which makes turbines and turbine controls more marketable.

An additional object of the invention is to provide a novel system and method for operating a steam turbine with improved static and dynamic control characterizations.

It is a further object of the invention to provide a novel system and method for operating a steam turbine which provides economic capability for dynamically optimizing or nearly dynamically optimizing turbine performance.

It is an additional object of the invention to provide a novel system and method for operating a steam turbine which results in reduced control system capital costs.

Another object of the invention is to provide a novel system and method for operating a steam turbine which provides for extended operational sophistication.

A further object of the invention is to provide a novel feedforward programmed computer control system for operating a steam turbine with improved, stable, more efficient, more accurate and faster performance.

It is another object of the invention to provide a novel feedforward programmed computer control system for operating a steam turbine with greater accuracy, greater flexibility in loop gain adjustment and other characteristics, and an updating capability in control loop static and dynamic characterization.

It is an additional object of the invention to provide a novel system for operating electric power plants and large electric power plant steam turbines with improved, stable, more efficient, more accurate and faster performance.

It is another object of the invention to provide a novel system for operating large electric power plant steam turbines including those supplied by fossil fuel fired drum type boilers with faster and more accurate steam valve positioning.

It is further object of the invention to provide a novel system for operating large electric power plant steam turbines including those supplied by fossil fuel fired drum type boilers with improved static and dynamic control loop characterization and reduced bandwidth limitation.

These and other objects of the invention will become more apparent upon consideration of the following detailed description along with the attached drawings.

DESCRIPTION OF THE PREFERRED EMBODIMENT

Figure 1:
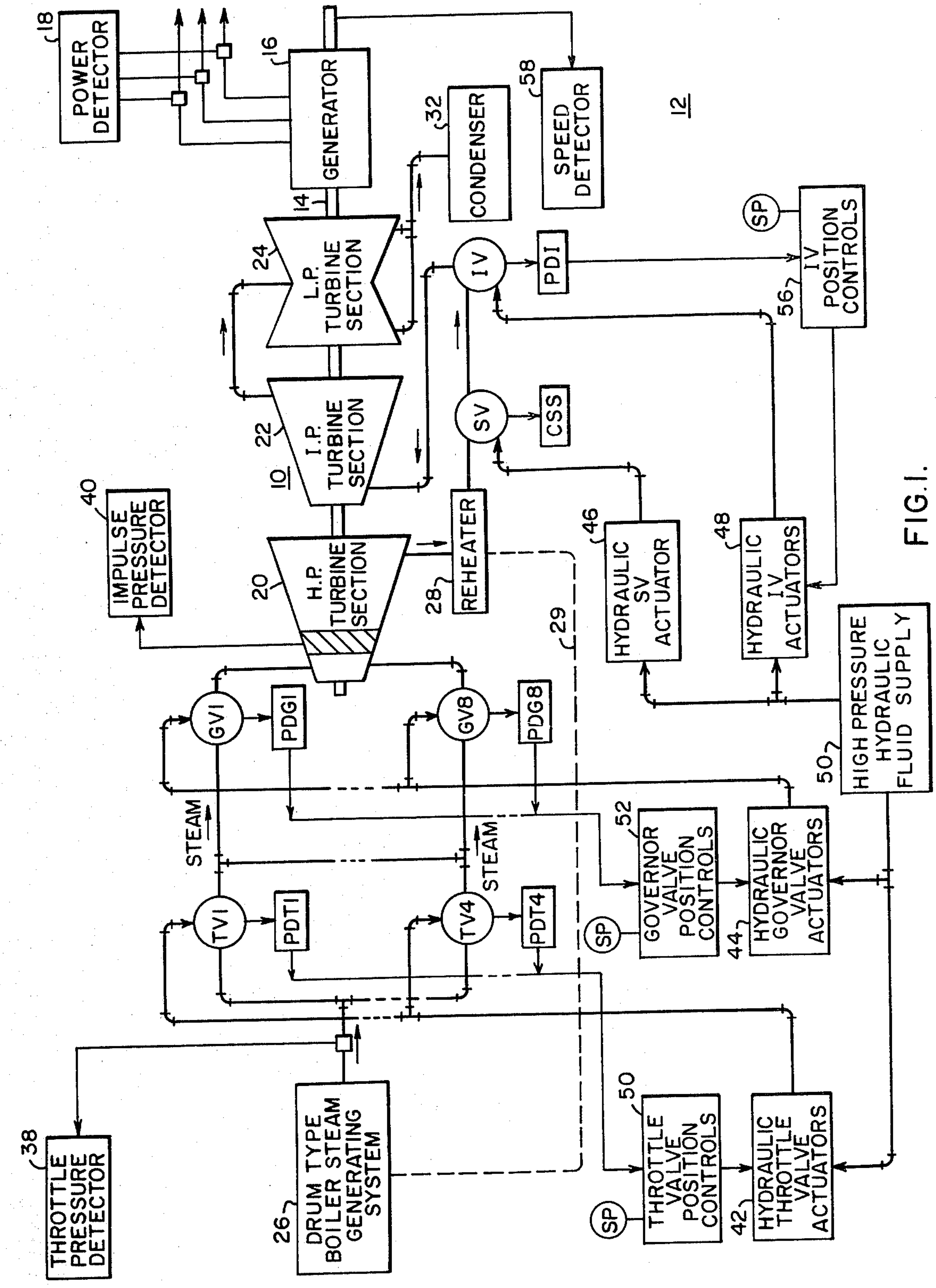
FIG. 1 shows a schematic diagram of an electric power plant including a large steam turbine and a fossil fuel fired drum type boiler and certain sensor and control devices which are all operable in accordance with the principles of the invention.

More specifically, there is shown in FIG. 1 a large single reheat steam turbine 10 constructed in a well known manner and operated and controlled in an electric power plant 12 in accordance with the principles of the invention. As will become more evident through this description, other types of steam turbines can also be controlled in accordance with the principles of the invention and particularly in accordance with the broader aspects of the invention.

The turbine 10 is provided with a single output shaft 14 which drives a conventional large alternating current generator 16 to produce three phase electric power (or other phase electric power) as measured by a conventional power detector 18. Typically, the generator 16 is connected (not shown) through one or more breakers (not shown) per phase to a large electric power network and when so connected causes the turbogenerator arrangement to operate at synchronous speed under steady state conditions. Under transient electric load change conditions, system frequency may be affected and conforming turbogenerator speed changes would result. At synchronism, power contribution of the generator 16 to the network is normally determined by the turbine steam flow which in this instance is supplied to the turbine 10 at substantially constant throttle pressure.

In this case, the turbine 10 is of the multi-stage axial flow type and includes a high pressure section 20, an intermediate pressure section 22 and a low pressure section 24. Each of these turbine sections may include a plurality of expansion stages provided by stationary vanes and an interacting bladed rotor connected to the shaft 14. In other applications, turbines operated in accordance with the present invention can have other forms with more or fewer sections tandemly connected to one shaft or compoundly coupled to more than one shaft.

The constant throttle pressure steam for driving the turbine 10 is developed by a steam generating system 26 which is provided in the form of a conventional drum type boiler operated by fossil fuel such as pulverized coal or natural gas. From a generalized standpoint, the present invention can also be applied to steam turbines associated with other types of steam generating systems such as the previously indicated nuclear reactor and once through boiler systems.

The turbine 10 in this instance is of the double-ended steam chest type, and steam flow is accordingly directed to the turbine steam chest (not specifically indicated) through four throttle inlet valves TV1–TV4. Generally, the double-ended steam chest type and other steam chest types such as the single ended steam chest type or the end bar lift type may involve different numbers and/or arrangements of throttle valving.

Steam is directed from the admission steam chest to the first high pressure section expansion stage through eight governor inlet valve GV1–GV8 which are arranged to supply steam to inlets arcuately spaced about the turbine high pressure casing to constitute a somewhat typical governor valving arrangement for large fossil turbines. Nuclear turbines might on the other hand typically utilize only four governor valves.

During startup, the governor valves GV1–GV8 are typically all fully open and stem flow control is provided by full arc throttling valve operation. At some point in the startup process, transfer is normally made from full arc throttle valve control to partial arc governor valve control because of throttling energy losses and/or throttling control capability. Upon transfer, the throttle valves TV1–TV4 are full open, and the governor valves GV1–GV8 are individually operated in a predetermined sequence usually directed to achieving thermal balance on the rotor and reduced rotor blade stressing while producing the desired turbine speed and/or load operating level. For example, in a typical governor valve control mode, governor valves GV5–8 may be initially closed as the governor valves GV1 through GV4 are jointly operated from time to time to defined positions producing the desired corresponding total steam flows. After the governor valves GV1–GV4 have reached the end of their control range, i.e. upon being fully opened, or at some overlap point prior to reaching their full position, the remaining governor valves GV5–GV8 are sequentially placed in operation in numerical order to produce continued steam flow control at higher steam flow levels. This governor valve sequence of operation is based on the assumption that the governor valve controlled inlets are arcuately spaced about the 360° periphery of the turbine high pressure casing and that they are numbered consecutively about the periphery so that the inlets corresponding to the governor valves GV1 and GV8 ar arcuately adjacent to each other.

The preferred turbine startup method is to (1) raise the turbine speed from the turning gear speed of about 2 rpm to about 80% of the synchronous speed under throttle valve control and then (2) transfer to governor valve control and raise the turbine speed to the synchronous value, close the power system breaker(s) and meet the load demand. On shutdown, similar but reverse practices are involved. Other transfer practices can be employed, but it is unlikely that transfer would ever be made at a loading point above 40% rated loading because of throttling efficiency considerations.

After the steam has coursed past the first stage impulse blading to the last stage reaction blading of the high pressure section, it is directed to a reheater system 28 which is associated with the boiler 26. In practice, the reheater system 28 might typically include a pair of parallel connected reheaters coupled to the boiler 26 in heat transfer relation as indicated by the reference character 29 and associated with opposite sides of the turbine casing.

With a raised enthalpy level, the reheated steam flows from the reheater system 28 through the intermediate pressure turbine section 22 and the low pressure turbine section 24. From the latter, the vitiated steam is exhausted to a condenser 32 from which water flow is directed (not indicated) back to the boiler 26.

To control the flow of reheat steam, stop valving SV including one or more check valves is normally open and is closed only to prevent steam backflow or to protect against turbine overspeed. Intercept valving IV including a plurality of valves (only one indicated) is also provided in the reheat steam flow path, and in this instance it is normally open and it operates over a range of positioning control to provide reheat steam flow cutback modulation under turbine overspeed conditions. Further description of overspeed protection is presented in the aforementioned Birnbaum, Braytenbah, and Richardson copending application.

In the typical fossil fuel drum type boiler steam generating system, the boiler control system controls boiler operations so that steam throttle pressure is held substantially constant. In the present description, it is therefore assumed as previously indicated that throttle pressure is an externally controlled variable upon which the turbine operation can be based. A throttle pressure detector 38 of suitable conventional design measures the throttle pressure to provide assurance of substantially constant throttle pressure supply, and, if desired as a programmed computer protective system override control function, turbine control action can be directed to throttle pressure control as well as or in place of speed and/or load control if the throttle pressure falls outside predetermined constraining safety and turbine condensation protection limits.

In general, the steady state power or load developed by a steam turbine supplied with substantially constant throttle temperature steam is determined as follows:

$$\text{Power or load} = K_P\, P_i/P_O = K_F S_F \qquad \text{Equation (1)}$$

where:

$P_i$=first stage impulse pressure
$P_O$=throttle pressure
$K_P$=constant of proportionality
$S_F$=steam flow
$K_F$=constant of proportionality.

When the throttle pressure is held substantially constant by external control as in the present case, the turbine load is thus proportional to the first stage impulse pressure $P_i$. The ratio $P_i/P_O$ may be used for control purposes, for example to obtain better anticipatory control of $P_i$ (i.e. turbine load) as the boiler controlled throttle pressure $P_O$ undergoes some variation within protective constraint limit values. However, it is preferred in the present case that the impulse pressure $P_i$ be used for feedback signalling in load control operation as subsequently more fully described, and a conventional pressure detector 40 is employed to determine the pressure $P_i$ for the assigned control usage.

Within its broad field of applicability, the invention can also be applied in nuclear reactor and other applications involving steam generating systems which produce steam without placement of relatively close steam generator control on the constancy of the turbine throttle pressure. In such cases, turbine control and operating philosophy is embodied in a form preferred for and tailored to the type of plant and turbine involved. In cases of unregulated throttle pressure supply, turbine operation may be directed with top priority to throttle pressure control or constraint and with lower priority to turbine load and/or speed control.

Respective hydraulically operated throttle valve actuators indicated by the reference character 42 are provided for the four throttle valves TV1–TV4. Similary, respective hydraulically operated governor valve actuators indicated by the reference character 44 are provided for the eight governor valves GV1–GV8. Hydraulically operated actuators indicated by the reference characters 46 and 48 are also provided for the reheat stop and intercept valving SV and IV. A computer sequenced and monitored high pressure fluid supply 50 provides the controlling fluid for actuator operation of the valves TV1–TV4, GV1–GV8, SV and IV. A computer supervised lubricating oil system (not shown) is separately provided for turbine plant lubricating requirements.

The respective actuators 42, 44, 46 and 48 are of conventional construction, and the inlet valve actuators 42 and 44 and in this instance the intercept valve actuators 48 are operated by respective stabilizing position controls indicated by the reference characters 50, 52 and 56. The position controls each include a conventional analog controller (not indicated) which drives a suitable known actuator servo valve (not indicated) in the well known manner. The reheat stop valve actuators 46 are manually or computer controlled to be fully open unless conventional trip system operation or other operating means causes them to close and stop the reheat steam flow.

Since turbine power is proportional to steam flow under the assumed controlled condition of substantially constant steam throttle pressure, steam valving position is controlled to produce control over steam flow as an intermediate variable and over turbine speed and/or load as an end controlled variable(s). Actuator operation provides the steam valve positioning, and respective valve position detectors PDT1–PDT4, PDG1–PDG8, and PDI are provided to generate respective valve position feedback signals for developing position error signals to be applied to the respective position controls 50, 52 and 56. One or more contact sensors CSS provides status data for the stop valving SV. The position detectors are provided in suitable conventional form, for example they can make conventional use of linear variable differential transformer operation in generating negative position feedback signals for algebraic summing with respective position setpoint signals SP in developing the respective input position error signals. Position controlled operation of the intercept valving IV would typically be provided only under reheat steam flow cutback requirements.

The combined position control, hydraulic actuator, valve position detector element and other miscellaneous devices (not shown) form a local hydraulic-electrical analog valve position control loop for each throttle or governor inlet steam valve. The position setpoints SP are computer determined and supplied to the respective local loops and updated on a periodic basis. Setpoints SP are also computed for the intercept valve controls. A more complete general background description of electrohydraulic steam valve positioning and hydraulic fluid supply systems for valve actuation is presented in the aforementioned Birnbaum and Noyes paper.

In the present case, local loop analog electrohydraulic position control is preferred primarily because of the combined effects of control computer operating speed capabilities and computer hardware economics, i.e. the cost of manual backup analog controls is less than that for backup computer capacity at present control computer operating speeds for particular applications so far developed. Shortly, however, economic and fast operating backup control computer capability is expected and direct digital computer control of the hydraulic valve actuators may then be preferred over the digital control of local analog controls described herein.

A speed detector 58 is provided to determine the turbine shaft speed for speed control and for frequency participation control purposes. The speed detector 58 can for example be in the form of a reluctance pickup (not shown) magnetically coupled to a notched wheel (not shown) on the turbogenerator shaft 14. Analog and/or pulse signals produced by the speed detector 58, the power detector 18, the pressure detectors 38 and 40, the valve position detectors PDT1–PDT4, PDG1–PDG8, and PDI, the status contact(s) CSS, and other sensors (not shown) and status contacts (not shown) are employed in programmed computer operation of the turbine 10 for various purposes including controlling turbine performance on an on line real time basis and further including monitoring, sequencing, supervising, alarming, displaying and logging.

Figure 2:
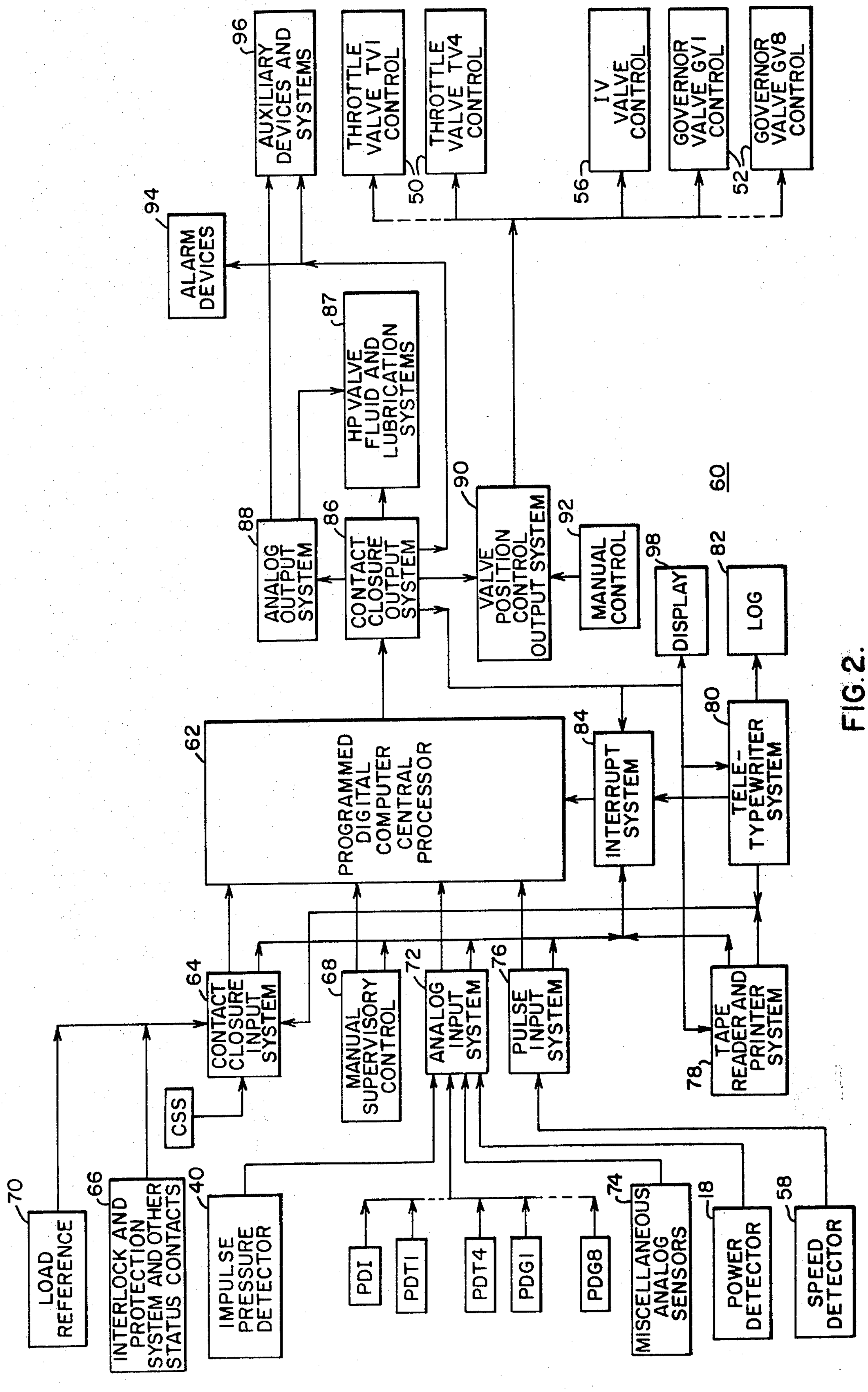
FIG. 2 shows a schematic diagram of a programmed digital computer control system operable with the steam turbine and its associated devices shown in FIG. 1 in accordance with the principles of the invention.

As illustrated in FIG. 2, a programmed digital computer control system 60 is provided for operating the turbine 10 with improved performance characteristics. It can include conventional hardware in the form of a central processor 62 and associated input/output interfacing equipment such as that sold by Westinghouse Electric Corporation under the trade name Prodac 50

(P50). In other cases such as when the turbine 10 as well as other plant equipment units such as the steam generating system 26 are all placed under computer control, use can be made of a larger computer system such as that sold by Westinghouse Electric Corporation and known as the Prodac 250 or separate computers such as P50 computers can be employed for the respective controlled plant units. In the latter case, control process interaction is achieved by tieing the separate computers together through data links and/or other means.

Generally, the P250 typically uses an integral magnetic core 16,000 word (16 bit plus parity) memory with 900 nanosecond cycle time, an external magnetic core 12,000 word or more (16 bit plus parity) memory with 1.1 microsecond cycle time and a mass 375,000 word or more (16 bit plus parity) random access disc memory unit. The P50 processor typically uses an integral magnetic core 12,000 word (14 bit) memory with 4.5 microsecond cycle time.

The interfacing equipment for the computer processor 62 includes a conventional contact closure input system 64 which scans contact or other similar signals representing the status of various plant and equipment conditions. Such contacts include the stop valve contact(s) CSS and are otherwise generally indicated by the reference character 66. The status contacts might typically be contacts of mercury wetted relays (not shown) which are operated by energization circuits (not shown) capable of sensing the predetermined conditions associated with the various system devices. Status contact data is used in interlock logic functioning in control or other programs, protection and alarm system functioning, programmed monitoring and logging and demand logging, functioning of a computer executed manual supervisory control 68, etc.

The contact closure input system 64 also accepts digital load reference signals as indicated by the reference character 70. The load reference can be manually set or it can be automatically supplied as by an economic dispatch computer (not shown). In the load control mode of operation, the load reference 70 defines the desired megawatt generating level and the computer control system 60 operates the turbine 10 to supply the power generation demand.

Input interfacing is also provided by a conventional analog input system 72 which samples analog signals from the plant 12 at a predetermined rate such as fifteen points per second for each analog channel input and converts the signal samples to digital values for computer entry. The analog signals are generated by the impulse pressure detector 40, the power detector 18, the valve position detectors PDI, PDT1–PDT4 and PDG1–PDG88, and miscellaneous analog sensors 74 such as the throttle pressure detector 38 (not specifically shown in FIG. 2), various steam flow detectors, various steam temperature detectors, miscellaneous equipment operating temperature detectors, generator hydrogen coolant pressure and temperature detectors, etc. A conventional pulse input system 76 provides for computer entry of pulse type detector signals such as those generated by the speed detector 58. The computer counterparts of the analog and pulse input signals are used in control program execution protection and alarm system functioning, programmed and demand logging, etc.

Information input and output devices provide for computer entry and output of coded and noncoded information. These devices include a conventional tape reader and printer system 78 which is used for various purposes including for example program entry into the central processor core memory. A conventional teletypewriter system 80 is also provided and it is used for purposes including for example logging printouts as indicated by the reference character 82.

A conventional interrupt system 84 is provided with suitable hardware and circuitry for controlling the input and output transfer of information between the computer processor 62 and the slower input/output equipment. Thus, an interrupt signal is applied to the processor 62 when an input is ready for entry or when an output transfer has been completed. In general, the central processor 62 acts on interrupts in accordance with a conventional executive program. In some cases particular interrupts are acknowledged and operated upon without executive priority limitations.

Output interfacing is provided for the computer by means of a conventional contact closure output system 86 which operates in conjunction with a conventional analog output sytem 88 and with a valve position control output system 90. A manual control 92 is coupled to the valve position control output system and is operable therewith to provide manual turbine control during computer shutdown and other desired time periods. Preferably, the valve position control output system 90 and the manual control 92 are provided in a form more specifically described in the aforementioned copending Giras and Barns application.

Certain computer digital outputs are applied directly in effecting program determined and contact controlled control actions of equipment including the high pressure valve actuating fluid and lubrication systems as indicated by the reference character 87, alarm devices 94 such as buzzers and displays, and predetermined plant auxiliary devices and systems 96 such as the generator hydrogen coolant system. Computer digital information outputs are similarly applied directly to the tape printer and the teletypewriter system 80 and display devices 98.

Other computer digital output signals are first converted to analog signals through functioning of the analog output system 88 and the valve position control output system 90. The analog signals are then applied to the auxiliary devices and systems 96, the fluid and lubrication system 87 and the valve controls 50, 52, and 56 in effecting program determined control actions. The respective signals applied to the steam valve controls 50, 52, and 56 are the valve position setpoint signals SP to which reference has previously been made. Position setpoint computation for the intercept valving controls 56 would typically only be required when the intercept valves IV are to be backed off from the full open position for modulated reheat steam flow cutback.

A steam turbine control programming system is employed to operate the computer system 60. It includes control and related programs as well as certain conventional housekeeping programs directed to internal control of the functioning of the computer system itself. The latter include the following:

(1) Priority Executive Program—Controls the use of the processor circuitry. In general, it does so on the basis of priorty classification of all of the control and housekeeping programs and some of the various kinds of interrupts. The highest bidding program or interrupt routine is determined and allowed to run when a change is to be made in the programmed instructions undergoing execution. Some interrupt routines run outside the priority structure as already indicated, particularly where safety and/or expensive equipment protection are involved.

(2) Analog Scan—Periodic execution for the entry of predetermined analog inputs which have been converted by the analog input system 72 and stored in the analog input system buffer register.

(3) Status Contact Scan—Periodic execution for the entry of predetermined status contact inputs.

(4) Programmers Entry Program—Demand execution allows the computer operator to enter information into the computer memory.

(5) Diagnostic Routine—Executed upon computer system malfunction interrupt.

The programming system control and related programs include the following:

(1) Data Logging—Periodic or demand execution for printout of predetermined events and parameter values.

(2) Alarm—Periodic and process interrupt execution for operating the alarm devices 94 and other system devices and for supervising and/or disabling the valve position and other control programs.

(3) Display—Periodic and demand execution for visual display (alphanumeric or graphic) of predetermined parameter values and/or trends.

(4) HP Valve Fluid Program—Periodic execution for supervisory control.

(5) Lubrication System Program—Periodic execution for supervisory control.

(6) Auxiliary Devices and Systems Programs—Periodic execution for supervisory control.

(7) Throttle and Governor Steam Valve Position Control Program—Periodic execution for control purposes.

(8) Intercept Valve Position Control Program—Periodic execution after and during overspeed alarm demand.

(9) Stop Valve Program—Records stop valve operation and if desired can be employed to operate or trip the stop valves under predetermined conditions.

Figure 3:
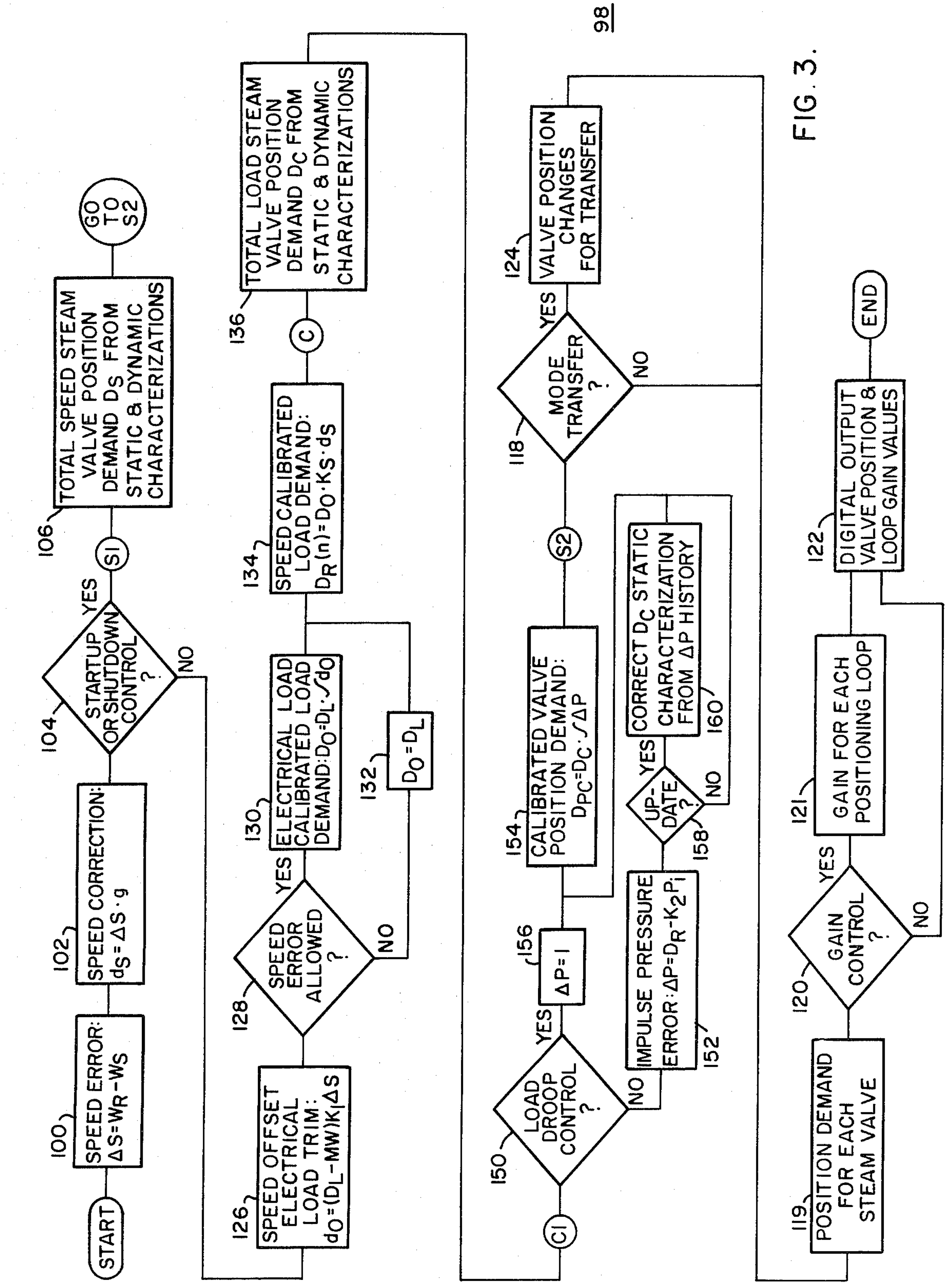
FIG. 3 shows a control logic flow diagram employed in part of a programming system which operates the computer system of FIG. 2 in accordance with the principles of the invention.
Figure 4:
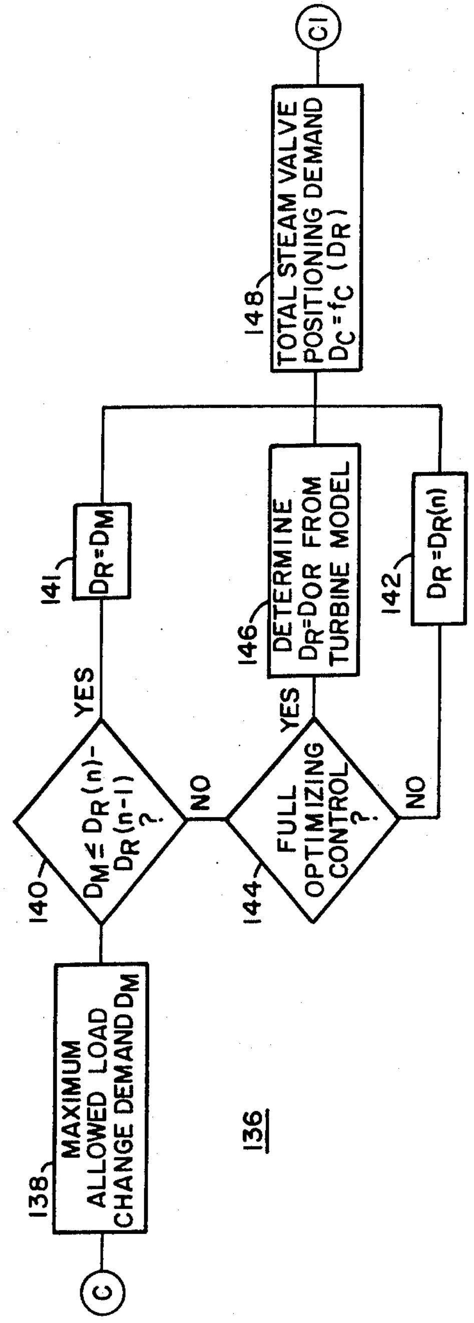
FIGS. 4 and 5 show certain portions of the control logic flow diagram of FIG. 3 in greater detail.
Figure 5:
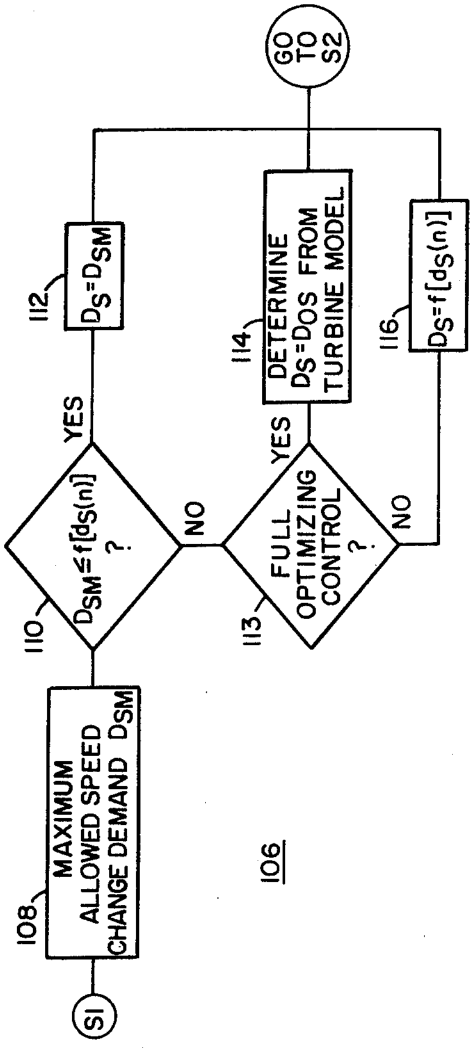

The present invention primarily involves the functioning of the throttle and governor steam valve position control program and further specific programming system description herein will accordingly be limited to it. Reference is made to FIGS. 3–5 where flow charts including certain algorithms are shown as a representation of the basic logic content of the throttle and governor steam valve position control program. Actual programs entered into the computer system 60 are coded in machine language from more detailed flow charts which are in turn derived from the illustrated flow charts.

Prior to startup, the turbine 10 is motor driven at the turning gear speed of about 2 rpm to minimize "breakaway torque" and to maintain shaft straightness. To start the turbine 10, a start signal is applied to the computer 62 as by operation of the manual control 68. Startup is allowed by programming system operation if the predetermined interlock logic permissives are satisfied including for example steam generating system functioning normally, steam throttle pressure at required value, power breakers open, turbine steam valves in starting positions, high pressure fluid system functioning normally, etc.

After startup clearance, the throttle and governor steam valve position control program represented by the reference character 98 in FIG. 3 is periodically executed such as at the rate of once per second to develop steam valve positioning actions directed first to bringing the turbine 10 to the synchronous speed and then to controlling the turbine load. As indicated by block 100, feedback turbine speed error $\Delta S$ is first determined by differencing a reference speed $w_R$ and the actual turbine speed $w_S$. In this instance, the speed reference $w_R$ is determined from a computer stored startup (or shutdown) ramp curve of turbine speed versus time, and it approximately provides for turbine speed changing (i.e. acceleration or deceleration) within predetermined dynamic limits. The speed reference can be conservatively determined and used as the only dynamic control or constraint characterization during startup or shutdown as in conventional analog controls. However, it is preferred that a more extended and more efficient startup and shutdown dynamic control characterization be employed as more fully described subsequently.

In the present application, wide range turbine speed control with load droop during turbine startup and shutdown involves feedback control loop operation. Thus, as shown in block 102, a determination of turbine speed correction $d_S$ is made from the product of the speed error $\Delta S$ and a predetermined loop gain g corresponding to the speed regulation desired for the system. The speed regulation g might for example be 3%, i.e. 3% overspeed at full turbine load results in full closure of the turbine steam valving. The numerical form of the speed correction $d_S$ thus is in percentage form to facilitate multiplication calibration in the turbine load control loop subsequently to be described. In effect, the gain g imposes dynamic characeterization on the turbine speed feedback control loop.

With the computer control 60 in the startup operating mode, program block 104 directs the program execution to block 106 which provides for determining total speed steam valve position demand $D_S$ in accordance with programmed static and dynamic characterizations. As shown more specifically in FIG. 5, maximum allowed speed change valve position demand $D_{SM}$ is preferably first determined to prevent turbine steam flow control action directed to excessive steam flow change rate or excessive inlet steam enthalpy change which would cause the turbine 10 to exceed predetermined dynamic limits based on thermal stress fatigue, centrifugal loading and/or other considerations. The maximum turbine speed valve position demand $D_{SM}$ in effect acts as a limit on turbine speed change rate (acceleration) and as such it is applied as a dynamic control as indicated in block 110 to constrain the demand $D_S(n)$ presently determined in accordance with a suitable function $f[d_S(n)]$ which statically characterizes the total demand $D_S$ as a function of the speed correction $d_S$. In applying limit action to the turbine speed change rate, the constraint demand $D_{SM}$ effectively acts as a feedback trim on the speed ramp $w_R$ which involves feedforward but only approximate dynamic constraint.

If the allowed demand $D_{SM}$ is a variable numeric value and the total demand $D_S(n)$ is greater than or equal to the allowed demand $D_{SM}$, the dynamic characterization is arranged to make $D_S$ equal to $D_{SM}$ as indicated by the reference character 112. If $D_S(n)$ is less than $D_{SM}$ and full turbine optimizing control is not applied by block 114, $D_S$ is accepted as being equal to the present determination $f[d_S(n)]$ as indicated by block 116. However, $D_{SM}$ neet not be a variable numeric quantity, and in this case it preferably either allows ramping of $w_R$ or disallows such ramping when speed change constraint is to be imposed. The steam valve movement then is determined by speed error based on a fixed reference speed value until the constraint action is released. In effect, equality of $D_{SM}$ with $D_S$ in block 112 means that $D_S$ equals $f[d_S(n)]$ with the reference $w_R$ held at a constant value.

Detailed description of dynamic characterizing logic employable in the maximum turbine speed demand block 108 is not needed for the description of the present invention. Reference is made to the aforementioned Berry application where there is described a turbine acceleration and loading control system which achieves substantially optimizing turbine speed constraint of the type preferred for the practice of the present invention.

Among other approaches for imposing a dynamic constraint on the turbine speed change rate, limit action can be placed less desirably on the rate at which computer determined steam valve position demands are executed to satisfy the demand for the end controlled variable, i.e. turbine speed in this instance. Thus, instead of limiting the valve position demand level $D_S$, position control loop gain can be limited by directly limiting the rate at which the steam valves are moved. In both cases, a limit is placed on the rate at which the inlet steam enthalpy or steam flow and in turn the impulse chamber steam temperature can vary. Since impulse chamber steam temperature variation rate is usually required to be limited, it is effective when so limited to determine the limit speed change rate.

In the general case, and when $D_S(n)$ is not limited by $D_{SM}$, $D_S$ can be made equal to a time varying demand variable $D_{OS}$ determined from an optimizing turbine thermodynamic model as indicated by the block 114 upon call by block 113, i.e. a dynamic characterization which ultimately defines the turbine speed demand $D_{OS}$ as a function of time in a manner resulting in the fastest possible turbine steam energization response to the required demand level corresponding to $f[d_S(n)]$ within the maximum speed demand constraint. The transient turbine steam valve positioning response thus could require steam valve overdrive and a subsequent return to the correct steady state valve position in order to achieve the fastest allowable speed correction turbine response. Such overdrive would be in excess of the short overshoot that can be and preferably is involved in fast valve positioning response to a changed position setpoint. When the block 114 is employed, it in effect imposes additional controlled amounts of gain in the speed feedback loop in developing optimizing computer valve position output signals.

In the present case, full optimizing control is generally not needed in the turbine startup and shutdown operation because most of the electric utility turbine operating life is spent at synchronous speed and because little if any improvement is normally achieved anyway as a result of the fact that the total demand $D_S(n)$ nearly always equals or exceeds the dynamic constraint $D_{SM}$ during startup and shutdown, i.e. in the preferred case the ramping of $w_R$ undergoes frequent turn-on and turn-off, and substantially optimum dynamic operation is therefore achieved particularly if the referenced Berry control is employed. The question block 113 and the optimizing block 114 are therefore either deleted from throttle and governor steam valve position control program 98 or the block 114 is treated as being potentially usable upon proper program development at the user's request.

In other turbine control applications such as where speed is regulated continuously as an end controlled turbine system variable, full dynamic turbine speed optimization control can well be desirable and preferred. It is thus primarily in relation to such alternate applications that the full dynamic optimization is described in conjunction with the large electric utility turbine control system 60. In such alternate cases, the end controlled variable error such as speed error $\Delta S$ can be acted upon directly in a feedforward manner by a model which provides static and optimizing dynamic characterizations similar to those described subsequently in conjunction with load control operation of the turbine 10 subject to constraint of maximum demand allowed to be placed on the controlled variable. In compound turbine applications, it is noteworthy that the system mechanical design is normally such that speed control of the primary turbine shaft necessarily results in proper operating speed for the other shaft(s).

After the total turbine speed valve position demand $D_S$ is determined to be equal to $f[d_S(n)]$, with or without ramp constraint, a determination is made as to whether a transfer is to be effected between the full arc throttle and the partial arc governor modes of steam valve control as indicated by block 118 in FIG. 3. In the startup control mode, transfer is preferably made from throttle to governor control when the turbine speed detector input shows the shaft speed equals 80% of the synchronous value, i.e. in this case at 2880 rpm. On shutdown, transfer is generally made from governor to throttle control as the turbine decelerates through the 80% speed level.

Before valve mode transfer during startup, the position demand DTV for each throttle valve is determined in block 119 from the total demand $D_S$ in accordance with a static characterization for that valve which defines its position demand level as a function of the total valve position demand level $D_S$ as follows:

$$DTV(x) = f(x)(D_S) \quad \text{Equation (2)}$$

where:

$x = 1 \ldots 4$.

In the case of the throttle valves TV1–TV4, the four static characterizations for the valves are interrelated such that the total demand value $D_S$ always equals the sum of the individual throttle valve demands, i.e. DTV1 plus DTV2 plus DTV3 plus DTV4. The demand level characterizations might for example be simple straight line functions which cause the total demand $D_S$ always to be satisfied by four equal individual throttle valve position demand values.

After determination of the position demand for the throttle valves TV1–TV4, the gain for the corresponding throttle valve position control 50 is computed if the control loop is on position loop gain control as determined by block 120. Thus, if the desired response to a position error is that which conforms to a 10% valve position overshoot as previously considered, that response may be obtainable consistently only if the gain of the local analog steam valve position loop is varied in accordance with the size of the valve position error. Accordingly, the position error of each throttle valve TV1–TV4 is determined as follows:

$$TPE(x) = TSP(x) + DTV(x) - PDT(x) \quad \text{Equation (3)}$$

where:

TPE=throttle valve position error
TSP=present setpoint position for the throttle valve
DTV=setpoint change for the throttle valve
PDT=actual detected position for the throttle valve
x=1 . . . 4.

From the position error, the positioning loop gain is determined for each throttle valve as follows:

$$G_p(x)=f[TPE(x)] \quad \text{Equation (4)}$$

where:
$G_p$=positioning loop gain
x=1 . . . 4.

In the simplest case, f[TPE(x)] is a constant for each throttle valve position control loop, i.e. no position loop gain control is provided. In other cases, as few as two or three gain values may be invoked in each valve control loop according to different respective ranges of position error TPE. In the most sophisticated application, wide gain variation is provided as a linear or nonlinear function of the position error TPE. Gain control for faster valve positioning would of course be made compatible with any positioning loop gain control imposed for dynamic constraint of the speed change rate in the event the latter gain control is employed.

It is preferred in the present case that gain control not be used in the turbine startup control mode since the variation in position error during startup typically is not wide enough to require valve position control loop gain variation for achieving desired valve positioning response. Thus, computer digital output position setpoint values are determined from the individual valve position demand levels as indicated by block 122. Such values are acted upon by the valve position control output system 90 in developing the setpoint signals SP for the throttle valves TV1–TV4. Where valve position control loop gain is determined, the gains $G_p$ for the four throttle valves TV1–TV4 are also converted by the block 122 and executed through the valve position control output system 90 by means of amplifier resistance variation or other suitable means in the four throttle valve controls 50.

When the increasing throttle valve steam flow causes the tubine 10 to reach the 80% speed value, valve mode transfer is initiated by the block 118 and block 124 then calculates the changes required in the throttle valve and governor valve positions to continue to accelerate the turbine 10 smoothly to the 100% speed value under governor valve control. After the transfer valve changes are computed, the position demand for each throttle valve and each governor valve is computed by adding the transfer changes to the speed error demands which are determined as previously described.

Suitable static characterizations correlating the throttle and governor valves are employed in computing the mode transfer valve position changes. The net valve position demands are determined as follows:

$$TTD(x)=DTV(x)+TV(x) \quad \text{Equation (5)}$$

where:
TTD=throttle valve transfer demand
x=1 . . . 4

$$GTD(x)=DGV(x)+GV(x) \quad \text{Equation (6)}$$

where:
GTD=governor valve transfer demand
x=1 . . . 8.

Generally, the throttle valves TV1–TV4 go to the full open position and all or some of the governor valves GV1–GV8 are moved from full open and operated in the partial arc mode in a sequential manner similar to that previously considered. Static characterizations are provided for each governor valve by the block 119 as follows:

$$DGV(x)=f_{(x)}(D_S) \quad \text{Equation (7)}$$

where:
x=1 . . . 8.

Under governor valve control, the digital output block 122 and if desired the gain block 120 function as previously described in developing output analog position control and if desired gain control for the governor valves GV1–GV8. When gain control is used for the governor valve position control loops, it is determined as follows:

$$G_p(x)=f_{(x)}[GPE(x)] \quad \text{Equation (8)}$$

where:
x=1 . . . 8

$$GPE(x)=GSP(x)+DGV(x)-PDG(x) \quad \text{Equation (9)}$$

where:
GPE=governor valve position error
GSP=present setpoint position for the governor valve
DGV=setpoint change for the governor valve
PDG=actual detected position for the governor valve
x=1 . . . 8.

If the valves are positioned by direct digital control through the control system computer instead of by computer supervised local analog position loop control, closed feeback computer control loop gain can be controlled in a manner similar to that described herein for the local analog position loop gain control.

When the turbine 10 has synchronized and the network breakers for the generator 16 are closed, the turbine computer control 60 is transferred from the startup speed control mode of operation to the load control mode of operation. The block 104 thereafter directs program execution to the first load control operation, preferably to block 126 which operates the load control looping to determine a speed offset electrical load trim $d_O$ to be applied to the reference load 70 or $D_L$. The trim is computed by multiplying the difference between the power detector indicated electrical load MW and the reference load $D_L$ against a speed offset which equals the load control speed error ΔS (i.e. the differences of actual speed from synchronous speed) times a proportionality constant $K_1$. The electrical load error provides slow load correcting action in an outer calibration loop, and it is because of the inherent slowness of electrical load correction that this correcting action is used only as a coarse or long term feedback calibrating loop.

If the turbine speed error ΔS is small enough as determined in block 128, the electrical load calibrated load demand is determined with reset action in block 130 from the product of the reference load $D_L$ and the time integral of the trim $d_O$ which is calculated in percentage form, i.e. 100% corresponds to no trim. When the speed error $\Delta S$ exceeds a predetermined value, electrical load calibration is omitted and $D_O$ is set equal to $D_L$ as indicated by block 132 in order to allow control system emphasis on speed correction.

Use of the speed offset $K_1 \cdot \Delta S$ in determining the trim $d_O$ offsets megawatt corrective action made unnecessary by projected speed corrective action. It thus prevents windup of the integral of $d_O$ in block 130 such as might occur on partial load rejection.

In the next programmed turbine load control operation, the turbine speed control loop preferably is calibration cascaded with the load control looping in block 134 which determines speed calibrated load demand $D_R(n)$. This operation provides for plant frequency participation particularly during transient periods following relatively large load changes. The speed correction $d_S$ is determined from the load control speed error $\Delta S$, and it is multiplied by a constant $K_S$ to provide a percent calibration, i.e. 100% corresponds to no calibration correction required. The determined load $D_O$ is then multiplied by the calibrator $K_S \cdot d_S$ to provide the electrical load calibrated and speed calibrated load demand $D_R(n)$. The multiplier calibration cascading of the speed and megawatt trim loops with the main turbine load control loop provides operating advantages as subsequently described more fully.

Steam valve total load position demand is next determined from static and dynamic characterizations in block 136 of FIG. 3 and as more specifically shown in FIG. 4. Preferably, a maximum load demand change $D_M$ is first determined as indicated by block 138 so as to place a limit on turbine loading change rate through limited steam flow change rate. The dynamic maximum loading constraint $D_M$ can simply be determined from storage as a fixed ramp which imposes a conservative constraint on load change rates, but preferably the maximum loading $D_M$ is determined with substantial optimization in a manner similar to that set forth in the Berry application. In applying limit action to the turbine load change rate, the constraint demand $D_M$ effectively acts as a dynamic constraint on the load control loop which as subsequently described is a feedforward control loop.

After turbine loading constraint determination, the calibrated load demand $D_R(n)$ is compared to $D_M$ as indicated by block 140 and $D_R$ is made equal to $D_M$ as indicated by block 141 if $D_M$ is equal to or less than $D_R(n)$ during loading. If $D_M$ is greater than $D_R(n)$ during loading, $D_R$ is made equal to $D_R(n)$ in block 142 when full optimizing control is omitted by block 144 as preferred in the present case. During the employment of unloading dynamic constraint, similar but opposite comparisons are made in determining whether $D_R = D_M$ and $D_M$ then in effect acts as a minimum constraint.

Similarly to dynamic speed constraint action, the other dynamic load constraint can also be imposed by other means such as by positioning loop gain control instead of through limit action on the valve position demand level $D_R$. In the latter case, the load feedback trim reset operation subsequently described herein is adversely affected. For this and other reasons, the load constraint programming of FIG. 4 is preferred.

If desired, the block 144 can direct the program logic flow to block 146 where full turbine load optimizing control is introduced in a manner similar to that considered in connection with full turbine speed optimizing control in the startup mode of operation. Normally, employment of a dynamic constraining loading control like that in the referenced Berry application results in substantially optimum dynamic operation so long as turbine load reference changes result in load demands in excess of the dynamic constraint loading. Within turbine loading constraints, full optimizing control employs a turbine thermodynamic loading model corresponding to the turbine under control to determine load demand $D_{OR}$ as a function of time in a manner resulting in the fastest turbine steam energization response to the required load demand level $D_R(n)$.

Transient valve position control produced by use of this model as well as that produced by use of the previously considered speed optimizing control model is facilitated by the use of future steady state corrective valve position(s) determined from the static valve characterization(s) in block 148 which will shortly be considered more fully. As in the case of turbine startup control, full optimizing turbine loading control can result in steam valve overdrive with subsequent return to the correct steady state valve position. Such overdrive would also be in excess of the short overshoot that is preferred for fast valve positioning response.

Full turbine optimizing control is normally not required and preferably is not employed in the present application because (1) many turbine load changes involve maximum turbine loading and (2) comparatively little improvement is realized for lower loadings when viewed from the perspective of other large electric power plant delays. For example, one-third of a step increase in turbine load demand is typically achieved almost immediately by high pressure section response to governor valve positioning action. The remaining two-thirds of the load increase would typically be produced by the intermediate pressure and low pressure sections within about 15 seconds without further governor valve movement as would otherwise be involved in governor valve overdrive and subsequent retracement to the correct steady state setpoint position. However, in other applications of the invention, full dynamic turbine load optimization control can well be desirable and preferred as in the case of dynamic turbine speed optimization control.

When the total load demand $D_R$ has been determined, it is next statically characterized and made equal to a value $D_C$ in the block 148, in this instance to compensate for nonlinear valve position-flow characteristics. The characterization in block 148 defines total steam valve position demand as a function of load demand $D_R$ so that steam flow changes are proportional to changes in $D_R$. This characterization determines the final position that the steam valving must acquire in order to satisfy the load demand $D_R$ whether $D_R$ equals $D_{OR}$ or $D_R(n)$ or $D_M$. The analog position controls then effect the valve position determination and the load control loop functions with feed-forward action. Any steam valve position error resulting from slightly erroneous characterization is corrected by load feedback reset as subsequently described. As previously suggested, some turbine control applications involving speed or some other variable as an end controlled quantity can similarly function with feedforward valve position control.

To determine the static turbine control characterization in the block 148, the computer control system 60 can be used during power plant installation and startup to operate the turbine 10 at synchronous speed and the actual developed turbine steady state load is empirically measured at each of successively higher reference megawatt load values $D_R$. Characteristic steam valve flow-position nonlinearity will cause the resultant plot to be nonlinear. Thus, the transfer function employed in the block 148 to provide a linearizing static characterization of valve position demand versus megawatt load $D_R$ is made equal to the inverse of the determined plot. With digital computer capability, the static characterization can thus be made very accurate. Further, the static characterization can be modified either automatically or under operator control with the convenience of software updating. When the end controlled variable is a quantity other than turbine load in other turbine applications, or when objects other than linearization are to be served, similar feedforward static characterization can be similarly accurately and flexibly determined and conveniently updated.

Where full dynamic turbine load optimization control is not provided by the block 146, the characterization of the block 148 can if desired further include dynamic rate action to achieve generally faster turbine steam energization if $D_R$ equals $D_R(n)$ and the rate action is held within the dynamic constraints imposed by $D_M$. Similar general rate action can if desired be imposed under similar conditions in block 116 of FIG. 5 in the turbine startup and shutdown modes of operation to achieve faster speed response within dynamic constraints.

With the total characterized load steam valve position demand determined, a determination is next made by block 150 as to whether the load control is operating with a completely open feedforward loop, i.e. whether it is in the load droop mode of operation. Load droop mode is used in the startup and shutdown control mode of operation as well as during preselected operating periods in the load control mode of operation.

Normally, the turbine system operates with load feedback calibration action and the load droop mode is thus normally not used. Preferably, load feedback calibration action is provided by a reset calibration loop which develops a turbine load error from the detected load representation. Since the turbine high pressure section impulse pressure is the fastest load signifier, the impulse pressure detector output is preferred for employment in the load reset calibration loop and it is first multiplied by a proportionality constant $K_2$ and then compared to the turbine load demand $D_R$ as indicated by block 152. The pressure error $\Delta P$ is then time integrated and applied as a percentage multiplier calibrator against the statically characterized total turbine load demand $D_C$. The result is set equal to $D_{PC}$ which is the final characterized and pressure calibrated steam valve total position demand as shown in block 154. The pressure correction provides reset action for the steady state turbine load operating level and trims the system to accurate operation even though slight feedforward errors might develop.

If the load control is in the droop mode of operation, $\Delta P$ is made equal to 1 as indicated by block 156 and no pressure correction is applied. In some cases, it may be desirable to include proportional action in the determination of $D_{PC}$ to produce faster pressure response, although such action is normally not especially needed nor preferred in the present type of application since relatively slow load trim provides highly desirable plant operation.

As determined in block 158, on line course updating of the feedforward static characterization can be provided if desired. With on line updating, some level of persistency in feedforward steady state valve positioning error is predetermined as calling for an updating correction of the static characterization of the block 148. Block 160 then examines a suitable historically weighted curve of experienced steady state pressure error as a function of operating level and correspondingly corrects the stored static characterization curve of the block 148. In this manner, the coarse updating correction compensates for feedforward errors even if the cause of the error is other than an error in the static valve flow-position characteristic(s). If no on line updating is employed, the block 158 always directs logic flow directly to block 154 or the blocks 158 and 160 are omitted and logic flow goes directly from the block 152 to the block 154.

In the turbine load control mode of operation, the mode transfer question in block 118 is always answered in the negative since the turbine 10 is already under partial arc governor valve control. The position demand is determined for each steam governor control valve in block 119 in a manner similar to that described for Equation (7) in connection with the startup control mode. In this case, the following equations determine the individual governor valve position demands:

$$DGV(x)=f_{(x)}(D_c) \text{ if load droop mode} \qquad \text{Equation (10)}$$

where:

$x=1\ldots8$ $$DGV(x)=f_{(x)}(D_{pc}) \text{ if no load droop} \qquad \text{Equation (11)}$$

where:

$x=1\ldots8$.

If desired, control of governor valve position control loop gain can be provided in block 121 in the load control mode in a manner similar to startup control mode Equation (8) by the following:

$$G_p(x)=f_{(x)}[GPE(x)] \qquad \text{Equation (12)}$$

where:

$x=1\ldots8$.

It is preferred that governor valve position control loop gain be controlled in the load control mode of operation since position error GPE can vary relatively widely. In this manner, improved steam valve positioning speed is realized and in turn faster turbine steam energization is realized. If no gain control is employed in the load control mode of operation, logic flow goes directly from the gain determination block 120 to the digital output block 122 thereby bypassing the gain calculation block 121. The digital output block 122 functions much like it does in the startup control mode in determining the digital output position setpoint values for the governor valves and the governor valve digital output loop gain values when applicable.

The turbine shutdown speed control mode of operation is similar to the startup mode in that like but reverse functioning is involved. For example, valve mode transfer is from governor to throttle and dynamic constraints limit the turbine deceleration. If desired, however, the conventional practice of coastdown can be employed for shutdown operation.

In summary, a system for operating a steam turbine determines a demand value of an end controlled variable and a predetermined static characterization is employed in determining the steam valve position demand required for steady state satisfaction of the demand for the controlled variable. Steam valving is positioned in accordance with the determined position control action. Since corrective valve position change is known before the change is completed, faster and more efficient and optimal or more nearly optimal steam valve positioning dynamics and in turn better steam turbine energization dynamics are more consistently enabled by a capability for steam valve position control loop gain control. In general, better steam turbine control loop operating speed is enabled by the nature of the basic steam valve operating system because control operation with feedback mulitplier calibration is enabled. Turbine dynamic optimizing capability is better enabled by the valve positioning foreknowledge because transient valve position control is better instituted for optimal or more nearly optimal steam turbine energization dynamics when the corrective steady state valve position is known. In electric power plants, better turbine operating dynamics provides for better electric power generation control.

In the electric power plant 12, the end controlled variable for the turbine control system 60 is generated electrical load during the load control mode of operation. To provide load control, a load reference demand is applied in the feedforward turbine load control loop which includes the computer system and its programming system and the throttle governor steam valve position control program, the local valve position control loops, and the governor steam valving. In general application of the invention, the feedforward controlled plant or turbine variable can be one or more other parameters such as turbine speed and the demand value for the variable can be an error demand or a reference demand.

Turbine speed is end variable controlled in the present case by the programmed computer control system 60 during the speed control mode of operation. That control in its preferred form is based on closed feedback loop operation, but it can be modified for feedforward operation if desired.

Under plant and turbine load control, a load reset loop also involves the computer programming system and employs impulse pressure feedback to produce steady state correction of the load reference demand by cascaded multiplier calibration. Megawatt multiplier calibration with speed offset is similarly cascaded into the feedforward load control loop. Since the net gain of the load loop drops with decreasing load error because of the multiplication calibration junctions, higher noncalibrated load loop gain is made possible within the band-width limitations imposed by requirements of noise elimination. Accordingly, faster and generally better turbine steam energization response and better plant operation are economically provided for the turbine 10 and the plant 12 by feedback loop multiplier calibration of the feedforward load control loop and for steam turbines in general by feedback loop multiplier calibration of feedforward control looping directed to any other end controlled system variable(s). The turbine 10 and its control employ local analog steam valve positioning control, but direct digital positioning control can be employed and in that event multiplier feedback position calibration can be advantageously included.

The speed control looping for the turbine 10 also includes the computer system and the computer programming system as well as the speed detector 58 and the local valve position control loops and the steam valving. During load control, the speed feedback loop provides improved plant frequency participation control since it acts as a cascaded multiplier calibrator of the load reference demand loop with resultant load loop gain improvement and faster response. Wide range turbine speed control is realized with better response in the startup and shutdown modes of operation because the speed feedback control loop operates separately from the load control loop, i.e. without cascading with gain limited load control looping as is typically the case with conventional analog closed pressure feedback load control looping.

In the speed and load control modes of operation of the turbine 10, dynamic characterization includes speed change or loading constraint on the speed control loop or the load control loop. Computer capability enables or facilitates dynamic constraint operation of the turbine 10 with improved turbine steam energization and plant power generation response and with the opportunity for optimizing or near optimizing dynamic constraint operation. Computer capability benefits dynamic control of steam turbines in general by better dynamic constraint control and further by facilitating the application of full dynamic optimizing control.

Computer control also economically provides for the employment of more accurate static valve position-flow characterization and thus more accurate, more efficient steam valve positioning and turbine steam energization and plant power generation response. Operator or automatic updating of valve static characterizations and any fixed dynamic control loop characterizations such as a fixed rate of reset action are conveniently enabled to provide needed flexibility for continued accuracy of operation as turbine use and other factors modify original relationships. Economic multiplier calibration of control looping in the manner previously described is also facilitated by computer control.

Software flexibility associated with computer control efficiently provides for accurate static steam valve characterization with capital economy across widely varying turbine system applications. Computer software flexibility also efficiently provides for better and freer choice of dynamic control characterization with capital economy across the turbine art.

Generally, computer control also enables turbine control systems to be manufactured with reduced hardware cost as a result of reduced interlocking, supervisory and similar hardware requirements. Computer control further enables turbine operation to be sophisticated economically well beyond the previous state of the turbine art through increased response capability, increased integrational capability and other means. As a result of the economic and performance benefits resulting from use of the invention, steam turbine and turbine control system marketability is increased.

The foregoing description has been presented only to illustrate the principles of the invention. Accordingly, it is desired that the invention not be limited by the embodiment described, but, rather, that it be accorded an interpretation consistent with the scope and spirit of its broad principles.

What is claimed is:

1. A system for operating a steam turbine comprising nonlinear operating steam valve means for determining the flow of steam through at least one section of the turbine, means for determining a representation of the actual value of at least one variable turbine condition selected from the turbine speed condition and the turbine load condition, programmed digital computer means having a reference representation of said one turbine condition, said computer system further having means for generating at least one predetermined linearizing characterization to offset the nonlinear relationship of valve position to steam flow, said digital computer means having means for generating position control signals for said valve means in accordance with the reference representation and the linearizing characterization and the actual condition representation, and means for controlling said valve means in accordance with the determined position control signals.

2. A turbine operating system as set forth in claim 1, wherein the reference representation is an input load demand, the turbine is a large steam turbine for electric power generation and the steam valve means include throttle valve means and governor valve means, wherein the turbine speed and the turbine load are placed under end control by operation of the valve means, means are provided for generating signals corresponding to actual speed and the actual load and for coupling the signals to said computer, and wherein said computer further includes means for generating throttle and governor valve position demands as a function of representations of the actual speed and load and the input load demand and the linearizing characterization.

3. A turbine operating system as set forth in claim 1, wherein said computer means generates output signals corresponding to position demands which define said valve control actions, and wherein a closed loop electrohydraulic positioning control includes individual position control loops responsive to the individual position signals to operate the throttle and governor valves.

4. A turbine operating system as set forth in claim 1, wherein the reference is a load reference and wherein said position control computer operating means includes means for determining in accordance with a predetermined feedforward characterization a representation of steam valve position demand required to satisfy a derived representation based on the load reference and wherein said feedforward characterization includes said linearizing characterization.

5. A method for operating a steam turbine having steam valve means for determining the flow of steam through at least one section of the turbine, the steps of said method comprising sensing the turbine speed and the turbine load, storing in a digital computer means at least one linearizing characterization of valve position demand as a function of a variable based on turbine operating demand to linearize the relationship of steam flow to the variable, operating the digital computer means to determine control actions in accordance with the linearizing characterization and the sensed speed and load and at least a load reference from which the turbine operating demand is derived, and controlling the valve means in accordance with the determined control actions.

6. A control system for operating an electric power steam turbine having steam valve means for determining the flow of steam through at least one section of the turbine, said control system comprising means for determining a representation of an input load demand, means for determining a representation of the actual value of the load, means for determining in accordance with another predetermined characterization a correctively modified load demand representation dependent upon error between the actual and the input demand values of the load, means for determining in accordance with a predetermined feedforward characterization a representation of steam valve position demand required to satisfy the correctively modified load demand representation, and means for controlling the valve means in accordance with the steam valve position demand representation.

7. A steam turbine control system as set forth in claim 6, wherein said modifying means provides multiplier calibration of the steam reference representation by a load error representation.

8. A steam turbine control system as set forth in claim 6, wherein said input load demand representing means includes means for determining an error representation of another predetermined operating variable, and means are provided for modifying the input load demand representation in accordance with the latter error representation.

9. A steam turbine control system as set forth in claim 8, wherein said valve controlling means includes at least one closed loop local electrohydraulic positioning control and said determining means include programmed digital computer means providing position setpoint control for said electrohydraulic positioning control.

10. A steam turbine control system as set forth in claim 8, wherein the modified load demand is multiplier calibrated by the first mentioned error representation, means are provided for further determining the steam valve position demand in accordance with a predetermined dynamic characterization, and the last-mentioned modifying means provides multiplier calibration of the input load demand representation by the error representation of the other operating variable.

11. A steam turbine control system as set forth in claim 8, wherein the last-mentioned modifying means provides multiplier calibration of the input demand representation by the error representation of the other operating variable.

12. A steam turbine control system as set forth in claim 8, wherein the other operating variable is the turbine speed, and means are provided for detecting a representation of turbine impulse pressure from which the actual load representation is determined.

13. A steam turbine control system as set forth in claim 6, wherein the steam flow determining means includes a plurality of steam valves, the steam valve feedforward position characterization includes a static characterization representing total steam valve position demand as a function of a representation of load demand, and said steam valve feedforward position demand characterization further includes a characterization representing individual steam valve position demands as a function of the total steam valve position demand.

14. A steam turbine control system as set forth in claim 6, wherein said steam valve controlling means includes at least one closed loop position control system characterized with a controllable gain, and means for controlling the position control loop gain in accordance with the steam valve position demand representation.

15. A system for operating a steam turbine comprising a steam turbine control system as set forth in claim 6 in combination with steam valve means for determining the flow of steam through at least one section of the turbine.

16. A steam turbine operating system as set forth in claim 15, wherein there is provided means for further determining the steam valve position demand in accordance with a predetermined dynamic characterization which limits the maximum rate of change of the end controlled variable.

17. A steam turbine operating system as set forth in claim 15, wherein said determining means includes programmed digital computer means having stored therein the steam valve feedforward characterization including a static characterization representing steam valve position demand as a function of a representation derived from load demand, and means are provided for operating said computer means to make determinations as defined.

18. A method for operating a steam turbine having steam valve means for determining the flow of steam through at least one section of the turbine, the steps of said method comprising determining a representation of an input load demand, determining a representation of the actual value of the load, determining in accordance with another predetermined characterization a correctively modified load demand representation dependent upon error between the actual and the input demand values of the load, determining in accordance with a predetermined feedforward characterization a representation of a steam valve position demand required to satisfy the correctively modified load, and operating said steam valve means in accordance with the steam valve position demand representation.

19. A steam turbine operating method as set forth in claim 18, wherein the steps of said method include using programmed digital computer means in making the defined determinations, using the computer means to determine the steam valve position demand from a predetermined static characterization representing steam valve position demand as a function of a representation derived from the load demand, and using the computer means to determine the predetermined static characterization by operating the steam turbine after installation at various load levels of operation.

20. A steam turbine operating method as set forth in claim 18, wherein the steps of said method include determining the steam valve position demand in a first control loop for the load demand, making a corrective determination in another control loop on the basis of feedback error in a preselected operating variable, and applying the corrective determination as a multiplier calibrator of the first control loop at a predetermined calibration junction of the first and the other control loops.

21. A steam turbine control system for a large electric power steam turbine which is provided with a plurality of turbine sections and a predetermined throttle valve arrangement and a predetermined governor valve arrangement, said system comprising means for determining representations of an input load demand and the actual value of turbine load, means for determining a representation dependent upon error between the actual and the input demand values of load, means for determining a representation of turbine speed error and for determining a correctively modified load demand representation in accordance with the speed error representation, means for determining a correctively modified load demand representation in accordance with the load error representation, means for determining in accordance with a predetermined feedforward static and dynamic characterization a representation of steam valve position demand at least for each of the governor valves as required to satisfy the load and speed correctively modified load demand during a load control operating mode, and means for controlling at least the governor steam valves in accordance with the steam valve position demand representations.

22. A large electric power steam turbine control system as set forth in claim 21, wherein means are provided for determining in accordance with another differing predetermined static and dynamic characterization a representation of steam valve position demand at least for each of the throttle valves as required to satisfy turbine speed demand during a speed control mode of operation.

23. A large electric power steam turbine control system as set forth in claim 21, wherein the turbine speed error representation is multiplier calibrated against the load demand input representation.

24. A large electric power steam turbine control system as set forth in claim 23, wherein the load error representation is multiplier calibrated against the speed calibrated load demand input representation.

25. A large electric power steam turbine control system as set forth in claim 21, wherein means are provided for determining an electrical load error representation, means are provided for offsetting the electrical load error representation with the speed error representation, and means are provided for calibrating a representation of the load demand input representation by multiplication against the speed offset electrical load error representation.

26. A large electric power steam turbine control system as set forth in claim 21, wherein means are provided for transferring between the full arc throttle and the governor modes of operation when the control system is in one of the two modes of operation defined as the speed control mode and the load control mode.

27. A large electric power steam turbine control system as set forth in claim 21, wherein said determining means includes digital computer means, at least the governor valve feedforward position characterization includes a static characteristic representing steam valve position demand as a function of a representation derived from load demand, and said computer means includes means to make determinations as defined.

28. A large electric power steam turbine control system as set forth in claim 27, wherein said computer means includes means for generating a representation of a load reference as a function of a representation of load demand, said computer means includes means for generating the speed error representation and the load error representation and for correctively modifying the load reference with the error representations, and said computer means includes said valve position demand determining means to generate valve position demand representations as a function of the correctively modified load reference.

29. A large electric power steam turbine control system as set forth in claim 28, wherein means are provided for generating megawatt and impulse pressure signals and for coupling said signals to said computer means, and said computer means includes means for generating the load error representation in accordance with at least one of said signals.

30. A system for operating an electric power generating plant comprising a steam turbine, means including a steam generating system for supplying steam to said turbine, a generator driven by said turbine and adapted to generate a predetermined electrical load for network operation with other generators, said turbine including a plurality of turbine sections, a predetermined throttle valve arrangement, a predetermined governor valve arrangement, said throttle and governor valves disposed to control the flow of steam between said steam generating system and said turbine, means for determining a representation of turbine speed error and for determining a correctively modified electrical load demand representation in accordance with the speed error representation, means for determining a representation of the actual value of turbine load, means for determining a representation dependent upon error between the actual and the input demand values of load, means for determining a correctively modified electrical load demand representation in accordance with the load error representation, means for determining in accordance with a predetermined feedforward static and dynamic characterization a representation of steam valve position demand at least for each of the governor valves as required to satisfy the load and speed correctively modified electrical load demand, and means for controlling said throttle and governor steam valves in accordance with the steam valve position demands.

31. An electric power plant system as set forth in claim 30, wherein said steam generating system includes a fossil fuel fired drum type boiler to supply steam to said turbine at substantially constant throttle pressure, and means are provided for determining an electrical load error representation, means are provided for offsetting the electrical load error representation with the speed error representation, and means are also provided for calibrating the load demand input representation by multiplication against the speed offset electrical load error representation.

32. An electrical power plant system as set forth in claim 30, wherein said determining and modifying means include digital computer means, and said digital computer means includes means to make the defined determinations.

33. An electric power plant system as set forth in claim 32, wherein means are provided for reheating steam after expansion in one turbine section and before admission to another turbine section, and means including said digital computer means for controlling the reheat steam flow.

34. A steam turbine control system for a large electric power steam turbine which is provided with a plurality of turbine sections and a predetermined throttle valve arrangement and a predetermined governor valve arrangement, said system comprising means for correctively controlling in accordance with a predetermined characterization the position of at least each of the governor valves in response to a representation of total load demand input during a load control operating mode, means for determining a representation of turbine speed error and for correctively modifying the operation of said valve position controlling means in accordance with the speed error representation, and means for controlling in accordance with another differing predetermined characterization the position of at least each of the throttle valves as required to satisfy turbine speed demand during a speed control operating mode.

35. A large electric power steam turbine control system as set forth in claim 34, wherein means are provided for determining an electrical load error representation, means are provided for offsetting the electrical load error representation with the speed error representation, and means are provided for calibrating the load demand input representation by multiplication against the speed offset electrical load error representation.

36. A large electrical power steam turbine control system as set forth in claim 34, wherein said determining and controlling means include digital computer means having stored therein the speed and load control characterizations.

37. A large electric power steam turbine operating system as set forth in claim 34, wherein the predetermined throttle and governor valve characterizations each include a predetermined linearizing characterization to offset the nonlinear relationship of valve position to steam flow.

38. A steam turbine control system for a large electric power steam turbine which drives a generator to produce electric power through breaker means and which is provided with a plurality of turbine sections and a predetermined throttle valve arrangement and a predetermined governor valve arrangement, said system comprising a digital computer having a representation of a speed reference for use during a speed control mode and a load control mode and a representation of a load reference for use during the load control mode, means for generating signals corresponding to the actual speed and load values and for coupling the signals to said computer, said computer including means for generating a representation of steam valve position demand as a function of representations of the actual and reference speed values during speed control and as a function of representations of the actual and reference speed and load values during load control, and a closed loop electrohydraulic positioning control for controlling the valve means in accordance with the steam valve position demand signal.

39. A turbine control system as set forth in claim 38, wherein said computer further includes means for generating at least one throttle valve position demand and a plurality of governor valve position demands and corresponding output signals as a function of representations of the actual speed and load and the reference speed and load values, and wherein the closed loop electrohydraulic positioning control includes corresponding throttle and governor valve position control loops responsive to the respective position signals to operate the throttle and governor valves.

40. A steam turbine control system for a large electric power steam turbine which drives a generator to produce electric power through breaker means and which is provided with a plurality of turbine sections and a predetermined throttle valve arrangement and a predetermined governor valve arrangement, said system comprising digital computer means having a representation of a speed reference for use during a speed control mode and a load control mode and a representation of a load reference for use during the load control mode, means for generating signals corresponding to the actual speed and load values and for coupling the signals to said computer means, said computer means including means for generating a representation of steam valve position demand as a function of representations of the actual and reference speed values during speed control and as a function of representations of the actual and reference speed and load values during load control, said computer means further including means for transferring between load and speed control modes according to whether the breaker means is closed or open, and means for controlling the individual throttle and governor valves in accordance with the position demand representation.

41. A large electric power steam turbine control system as set forth in claim 40, wherein said computer means includes means for generating at least an output corresponding to the steam valve position demand, and a closed loop electrohydraulic positioning control having individual position control loops for operating the respective throttle and governor valves in accordance with the computer output.

42. A large electric power steam turbine control system as set forth in claim 41, wherein said computer means includes means for generating an output which includes at least one throttle valve position signal and at least a plurality of individual governor valve position signals for application to said electrohydraulic positioning control.

43. A large electric power steam turbine control sysem as set forth in claim 40, wherein the actual load signal is a signal representative of turbine impulse pressure.

44. A large electric power steam turbine control system as set forth in claim 40, wherein at least two actual load signals are generated in correspondence to actual turbine impulse pressure and actual generated megawatts and wherein said computer position demand generating means responds to the impulse pressure and the megawatt load values.

45. A large electric power steam turbine control system as set forth in claim 40, wherein said position demand generating means includes means for determining in accordance with a predetermined feedforward characterization a representation of steam valve position demand required to satisfy a derived representation based on the load reference during load control, and means for modifying the load reference representation in accordance with the difference between the actual and the reference speed values and in accordance with the load value to generate the derived reference representation.

46. A steam turbine operating system as set forth in claim 45, wherein said digital computer means includes means for modifying the linearizing characterization to improve its operating accuracy.

47. A large electric power steam turbine control system as set forth in claim 40, wherein said function of said position demand generating means includes a predetermined linearizing characterization to offset the nonlinear relationship of valve position to steam flow.

48. A large electric power steam turbine operating system as set forth in claim 40, wherein said valve position demand generating means is provided with a governor valve position characterization and a different throttle valve position characterization respectively for use in the load control and speed control modes.

49. A large electric power steam turbine operating system as set forth in claim 48, wherein said digital computer means further includes means for generating changes in the throttle and governor valve position demand representations during valve mode changes in the speed and load control modes of operation.

50. A steam turbine control system for a large electric power steam turbine which is provided with a plurality of turbine sections and a predetermined throttle and governor valve arrangement, said system comprising means for generating a signal representative of actual turbine speed, means for generating a signal representative of actual turbine load, means for generating a representation of steam valve position demand as a function of representations of the actual turbine speed and load and reference speed and load values, means for periodically coupling said signals to said position demand generating means and for periodically operating said position demand generating means to generate the position demand representation continuously, and means for positioning the throttle and governor valves in accordance with the position demand representation.

51. A large electric power steam turbine control system as set forth in claim 50, wherein the turbine drives a generator to produce power through a breaker means, and wherein a digital computer includes said position demand generating means and the speed reference is provided for comparison to a computer stored representation of the actual speed during a speed control mode and a load control mode and the load reference is provided for comparison to a computer stored representation of the actual load during the load control mode, and said computer includes means for transferring between the load and speed control modes according to whether the breaker means is closed or open.

52. A large electric power steam turbine control system as set forth in claim 50, wherein digital computer means includes said position demand generating means, said computer means including means for generating continuous output signals corresponding to the position demand representation, and said valve positioning means including a closed loop electrohydraulic positioning control for controlling the valves.

53. A large electric power steam turbine control system as set forth in claim 52, wherein the position demand generating means generates the valve position demand in accordance with a throttle valve characterization in response to the actual and reference turbine speed values at least during speed control and in accordance with a different governor valve characterization in response to the actual and reference speed and load values at least during load control.

54. A steam turbine control system for a large steam turbine having a predetermined throttle and governor valve arrangement, said system comprising means for generating a signal representative of actual turbine speed, means for generating a signal representative of generated megawatt electrical load, means for generating a representation of steam valve position demand as a function of representations of the actual turbine speed and megawatt load and reference speed and megawatt load values, means for coupling said signals to said position demand generating means, said position demand generating means having means for comparing representations of the actual speed and a reference speed and representations of the actual megawatt load and a reference load to provide speed and megawatt error representations, said position demand generating means having means for generating a corrective load demand representation in a load control path in accordance with the speed and megawatt error representations, said megawatt error representation being multiplied against the load control path in the generation of the corrective load demand representation and the valve position demand representation being generated in accordance with the corrective load demand representation, and means for positioning the throttle and governor valves in accordance with the position demand representation.

55. A large electric power system turbine control system as set forth in claim 54, wherein digital computer means includes said position demand generating means and wherein means are provided for generating a signal representative of actual turbine impulse pressure and said position demand generating means further having means for comparing the megawatt and speed corrective load reference and a representation of the actual impulse pressure to provide an impulse pressure error representation and for generating the corrective load demand representation in accordance with the impulse pressure error representation.

56. A large electric power steam turbine control system as set forth in claim 54, wherein said position demand generating means further includes means for determining the valve position demand representation in accordance with a predetermined feedforward characterization which defines the valve position required to satisfy a representation based on the corrective load demand.

57. A large electric power steam turbine control system as set forth in claim 54, wherein the turbine drives a generator to produce electric power through breaker means, a digital computer system includes said position demand generating means to generate a representation of steam valve position demand as a function of the actual and reference speed values during speed control and as a function of the actual and reference speed and load values during load control, and wherein said computer further includes means for transferring between load and speed control modes according to whether the breaker means is closed or open.

58. A large electric power steam turbine control system as set forth in claim 54, wherein digital computer means includes said position demand generating means and said computer means includes means for generating at least one output signal corresponding to the steam valve position demand, and wherein said valve positioning means is a closed loop electrohydraulic positioning control.

59. A large electric power steam turbine control system as set forth in claim 54, wherein said valve position demand generating means is provided with a governor valve position characterization and a different throttle valve position characterization for use in the speed control and load control functions.

60. A steam turbine control system for a large electric power steam turbine which is provided with a plurality of turbine sections and a predetermined throttle and governor valve arrangement, said system comprising means for generating a signal representative of actual turbine speed, means for generating a signal representative of actual turbine load, digital computer means, means for coupling said signals to said computer means, said digital computer means including means for comparing representations of the actual speed and a reference speed and representations of the actual load and a reference load to provide speed and load error representations, said digital means further including means for generating a corrective load demand representation in a load control path in accordance with the load and speed error representations and for generating a corrective speed demand representation in a speed control path in accordance with the speed error representation, said digital computer means including means for generating representations of at least throttle valve position demands in accordance with the corrective speed demand representation on speed control and at least governor valve position demands in accordance with the corrective load demand representation on load control, said digital computer means further including means for generating changes in the throttle and governor valve position demand representations during valve mode changes in the speed and load control modes of operation, and means for positioning the throttle and governor valves in accordance with the position demand representations.

61. A large electric power steam turbine control system as set forth in claim 60, wherein the valve position demand representations are generated during a change from throttle valve to governor valve operation in the speed control mode.

62. A large electric power steam turbine control system as set forth in claim 61, wherein said position demand generating means further operates in accordance with a predetermined linearizing characterization of offset the nonlinear relationship of valve position to steam flow.

63. A large electric power steam turbine control system as set forth in claim 60, wherein the actual load signal is a megawatt signal and the reference load value is a megawatt value and the load error is a megawatt error multiplied against the load control path.

64. A large electric power steam turbine control system as set forth in claim 60, wherein said computer further includes means for transferring between load and speed control modes according to whether the breaker means is closed or open.

65. A large electric power steam turbine control system as set forth in claim 64, wherein said computer includes means for generating at least one output signal corresponding to the steam valve position demand, and wherein said valve positioning means is a closed loop electrohydraulic positioning control.

66. A large electric power steam turbine control system as set forth in claim 60, wherein said computer means includes means for generating at least one output signal corresponding to the steam valve position demand, and wherein said valve positioning means is a closed loop electrohydraulic positioning control.

67. A large electric power steam turbine control system as set forth in claim 60, wherein said position demand generating means further operates in accordance with a predetermined linearizing characterization to offset the nonlinear relationship of valve position to steam flow.

68. A large electric power steam turbine operating system as set forth in claim 60, wherein said valve position demand generating means further operates in accordance with a throttle valve characterization and a second different governor valve characterization during speed and load control.

* * * * *